US012695215B2

(12) United States Patent
Qing et al.

(10) Patent No.: US 12,695,215 B2
(45) Date of Patent: Jul. 28, 2026

(54) ARRAY ANTENNA AND A METHOD OF GENERATING CIRCULARLY POLARIZED BEAMS

(71) Applicant: Agency for Science, Technology and Research, Singapore (SG)

(72) Inventors: Xianming Qing, Singapore (SG); Xinyi Tang, Singapore (SG); Nasimuddin, Singapore (SG); Yijun Zhou, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 31 days.

(21) Appl. No.: 18/845,142

(22) PCT Filed: Mar. 8, 2023

(86) PCT No.: PCT/SG2023/050146

§ 371 (c)(1),
(2) Date: Sep. 9, 2024

(87) PCT Pub. No.: WO2023/172200

PCT Pub. Date: Sep. 14, 2023

(65) Prior Publication Data

US 2025/0183557 A1 Jun. 5, 2025

(30) Foreign Application Priority Data

Mar. 9, 2022 (SG) ........................... 10202202388R

(51) Int. Cl.
*H01Q 1/24* (2006.01)
*H01Q 3/34* (2006.01)
(Continued)

(52) U.S. Cl.
CPC ............... *H01Q 21/24* (2013.01); *H01Q 3/34* (2013.01); *H01Q 21/061* (2013.01)

(58) Field of Classification Search
CPC ......... H01Q 21/24; H01Q 3/34; H01Q 21/061
See application file for complete search history.

(56) References Cited

U.S. PATENT DOCUMENTS

2013/0057449 A1* 3/2013 Orihashi ................ H01Q 21/24
343/853

FOREIGN PATENT DOCUMENTS

CN 106257303 A 12/2016

OTHER PUBLICATIONS

International Search Report and Written Opinion for PCT/SG2023/050146 mailed Sep. 25, 2023, 9 pages.

(Continued)

*Primary Examiner* — David E Lotter
(74) *Attorney, Agent, or Firm* — Kilpatrick Townsend & Stockton LLP

(57) ABSTRACT

There is provided an array antenna and a method of generating circularly polarized beams using an array antenna, the array antenna comprising, a plurality of sub-arrays, each of the plurality of sub-arrays comprising, a plurality of antenna elements, each antenna element comprising a first feeding port and a second feeding port; a physical integrated circuit (IC) comprising a plurality of first and second output channels; a first feeding network comprising a plurality of first feed lines communicatively coupling each of the first output channels of the physical IC to a first feeding port of each of the plurality of antenna elements; and a second feeding network comprising a plurality of second feed lines communicatively coupling each of the second output channels of the physical IC to a second feeding port of each of the plurality of antenna elements; wherein the physical IC is configured to excite the plurality of antenna elements via the first feeding network to generate a first circularly polarized (CP) beam and to excite the plurality of antenna elements via (Continued)

the second feeding network to generate a second CP beam, and wherein the respective first CP beams from each of the plurality of sub-arrays form a first combined CP beam; and the respective second CP beams from each of the plurality of sub-arrays form a second combined CP beam.

18 Claims, 17 Drawing Sheets

(51) Int. Cl.
*H01Q 21/06* (2006.01)
*H01Q 21/24* (2006.01)

(56) References Cited

OTHER PUBLICATIONS

Banerjee et al., Design of Dual Circular Polarized Wideband Stacked Patch Flat Panel Phased Array Antenna using Ka-band 5G Silicon RFICs in Beamforming Network, 2021 IEEE 19th International Symposium on Antenna Technology and Applied Electromagnetics (ANTEM), Aug. 11, 2021, 2 pages.

Tang et al., Beam Steering Resolution for Large Antenna Array, 2021 IEEE International Symposium on Antennas and Propagation and USNC-URSI Radio Science Meeting (APS/URSI), Dec. 10, 2021, pp. 273-274.

Shi et al., Wideband Circularly Polarized LTCC Modular Phased Array Antenna at Ka-band, 2021 IEEE International Symposium on Antennas and Propagation and USNC-URSI Radio Science Meeting (APS/URSI), Dec. 10, 2021, pp. 1179-1180.

Woelders et al., Cross-Polarization and Sidelobe Suppression in Dual Linear Polarization Antenna Arrays, IEEE Transactions on Antennas and Propagation, Dec. 31, 1997, vol. 45, No. 12, pp. 1727-1740.

* cited by examiner 5.0 × 5. 0×1.1 mm

ARRAY ANTENNA AND A METHOD OF GENERATING CIRCULARLY POLARIZED BEAMS

CROSS-REFERENCE TO RELATED APPLICATIONS

This application is a 371 National Stage filing of PCT Application No. PCT/SG2023/050146, filed Mar. 8, 2023, which claims priority to SG patent application Ser. No. 10202202388R, filed Mar. 9, 2022, which are incorporated by reference herein in their entirety.

TECHNICAL FIELD

The present disclosure relates broadly to an array antenna and a method of generating circularly polarized (CP) beams.

BACKGROUND

Airborne satellite communication and the advent of Low Earth Orbit (LEO), Medium Earth Orbit (MEO), and Geostationary Equatorial Orbit (GEO) constellations are expected to enable connectivity during air travel. An airborne beam steering antenna system is one of the key technologies to facilitate this. Similar technology is also used in other moving platforms where communication with satellites is needed.

Current antenna systems for commercial jet satellite communications (SATCOMs) are mostly mechanically steered to point to a communication satellite: traditional multi-gimbal antennas and Variable Inclination Continuous Transverse Stub (VICTS) array antenna are both available for commercial jet connectivity applications at both Ku- and Ka-bands. Both technology implementations impact aerodynamic performance of airplanes when they are mounted on the platform thereof. For example, the protective radome of the antenna adds to the drag. Both technology implementations are also very heavy, thus contributing even further to fuel burn. Mechanical moving parts are also prone to fatigue and contribute negatively to the overall reliability and maintainability of commercial jets. Newer constellations (e.g., MEO and LEO) also bring challenges related to satellites handovers and increased Doppler effect, requiring multiple satellite tracking.

Therefore, the market is ready for a thinner, zero-moving antenna part, namely, an electronically beam steering antenna. Compared with mechanical beam steering antenna solutions, a flat electronically beam steering antenna system is expected to offer comparable electrical performance while enhancing aerodynamic performance. In addition, a flat electronically beam steering antenna system may be more economical because of the reduced weight for less fuel consumption, higher scanning speed, better maintainability because of no mechanical moving parts, and higher agility because of the use of electronic switch, and so on. Further, there is a long felt need to have independently controlled simultaneous beams with selectable polarizations, i.e., left-handed circular polarization (LHCP) and right-handed circular polarization (RHCP), for multi-constellation communication.

To establish links with multiple satellites, polarizations must be aligned or changed according to the satellites. For a given antenna panel size and power consumption, a direct solution for implementing dual beams is to divide the antenna panel into two halves, each half of the panel configured to produce one steering CP beam independently.

However, such a configuration with half antenna aperture utilization will cause, in general, a 3-dB antenna gain drop or 6-dB effective isotropic radiation power (EIRP) reduction.

Thus, there is a need for an array antenna and a method of generating CP beams which seek to address or at least ameliorate one of the above problems.

SUMMARY

In accordance with a first aspect of the present disclosure, there is provided an array antenna comprising, a plurality of sub-arrays, each of the plurality of sub-arrays comprising, a plurality of antenna elements, each antenna element comprising a first feeding port and a second feeding port; a physical integrated circuit (IC) comprising a plurality of first and second output channels; a first feeding network comprising a plurality of first feed lines communicatively coupling each of the first output channels of the physical IC to a first feeding port of each of the plurality of antenna elements; and a second feeding network comprising a plurality of second feed lines communicatively coupling each of the second output channels of the physical IC to a second feeding port of each of the plurality of antenna elements; wherein the physical IC is configured to excite the plurality of antenna elements via the first feeding network to generate a first circularly polarized (CP) beam and to excite the plurality of antenna elements via the second feeding network to generate a second CP beam, and wherein the respective first CP beams from each of the plurality of sub-arrays form a first combined CP beam; and the respective second CP beams from each of the plurality of sub-arrays form a second combined CP beam.

The plurality of antenna elements in all the plurality of sub-arrays may be collectively arranged in a square lattice configuration having a first direction and a second direction, wherein the second direction is substantially perpendicular to the first direction, and wherein any two immediately adjacent antenna elements positioned along the first direction and any two immediately adjacent antenna elements positioned along the second direction are separated by a distance of about $0.5\lambda$, where $\lambda$ represents a free space wavelength of the first or second CP beam.

The array antenna may further comprise a virtual sub-array comprising antenna elements of neighboring sub-arrays, and wherein the physical ICs of the neighboring sub-arrays are configured to respectively excite the antenna elements of the virtual sub-array to generate a third and/or a fourth CP beam, said third CP beam contributing to form the first combined CP beam, and said fourth CP beam contributing to form the second combined CP beam.

The physical ICs of the neighboring sub-arrays may be respectively configured to adjust an amplitude and a phase of excitation of respective antenna elements coupled thereto, in order to generate the third and/or fourth CP beams.

The virtual sub-array may be formed from antenna elements from two sub-arrays that are adjacent to each other along the first direction or the second direction, said antenna elements of the virtual sub-array immediately adjacent to each other within the square lattice.

The virtual sub-array may be formed from antenna elements from four sub-arrays that are arranged in a 2×2 configuration, said antenna elements of the virtual sub-array immediately adjacent to each other within the square lattice.

Each of the virtual sub-arrays may comprise four antenna elements arranged in a 2×2 square lattice configuration.

Each virtual sub-array may be separated by a distance of about 0.5λ from an immediately adjacent sub-array or virtual sub-array positioned along the first direction or the second direction, where A represents a free space wavelength of the first or second CP beam.

The physical ICs may be configured to excite the plurality of antenna elements of each sub-array and virtual sub-array in a sequentially rotated manner with identical amplitude and 90° phase difference.

The first, second, third and fourth CP beams may be simultaneously generated, and wherein the first and second CP beams are each independently a left-handed circularly polarized (LHCP) beam or a right-handed circularly polarized (RHCP) beam, and further wherein the third CP beam follows the direction of polarization of the first CP beam and the fourth CP beam follows the direction of polarization of the second CP beam.

The first and second feeding ports of each antenna element may be orthogonally orientated with respect to each other.

For each sub-array, any two antenna elements that are immediately adjacent to each other along the first direction and second direction may be orientated such that one antenna element is rotated at an angle of 90° with respect to the other antenna element.

The physical IC may be configured to perform amplitude quantization of the CP beams, wherein the amplitude quantization is implemented by selecting a cut-off value of amplitude to achieve a distribution of amplitudes with less tapering and normalizing the distribution of amplitudes to a new reference value based on the cut-off value.

In accordance with a second aspect of the present disclosure, there is provided a method of generating CP beams using an array antenna comprising, a plurality of sub-arrays, each of the plurality of sub-arrays comprising, a plurality of antenna elements, each antenna element comprising a first feeding port and a second feeding port; a physical IC comprising a plurality of first and second output channels; a first feeding network comprising a plurality of first feed lines communicatively coupling each of the first output channels of the physical IC to a first feeding port of each of the plurality of antenna elements; and a second feeding network comprising a plurality of second feed lines communicatively coupling each of the second output channels of the physical IC to a second feeding port of each of the plurality of antenna elements; wherein the method comprises, using the physical IC to excite the plurality of antenna elements via the first feeding network to generate a first circularly polarized (CP) beam and to excite the plurality of antenna elements via the second feeding network to generate a second CP beam, and forming a first combined CP beam from the respective first CP beams generated from each of the plurality of sub-arrays and forming a second combined CP beam from the respective second CP beams generated from each of the plurality of sub-arrays.

The plurality of antenna elements in all the plurality of sub-arrays may be collectively arranged in a square lattice configuration having a first direction and a second direction, wherein the second direction is substantially perpendicular to the first direction, and wherein any two immediately adjacent antenna elements positioned along the first direction and any two immediately adjacent antenna elements positioned along the second direction are separated by a distance of about 0.5λ, where λ represents a free space wavelength of the first or second CP beam.

The array antenna may further comprise a virtual sub-array comprising antenna elements of neighboring sub-arrays, the method may further comprise configuring the physical ICs of the neighboring sub-arrays to respectively excite the antenna elements of the virtual sub-array to generate a third and/or a fourth CP beam, said third CP beam contributing to form the first combined CP beam, and said fourth CP beam contributing to form the second combined CP beam.

The step of configuring the physical ICs of the neighboring sub-arrays to respectively excite the antenna elements of the virtual sub-array may comprise adjusting an amplitude and a phase of excitation of respective antenna elements coupled thereto, in order to generate the third and/or fourth CP beams.

The virtual sub-array may be formed from antenna elements from two sub-arrays that are adjacent to each other along the first direction or the second direction, said antenna elements of the virtual sub-array immediately adjacent to each other within the square lattice.

The virtual sub-array may be formed from antenna elements from four sub-arrays that are arranged in a 2×2 configuration, said antenna elements of the virtual sub-array immediately adjacent to each other within the square lattice.

The method may further comprise exciting the plurality of antenna elements in each sub-array and virtual sub-array using the physical IC in each sub-array in a sequentially rotated manner with identical amplitude and 90° phase difference.

The method may further comprise simultaneously generating the first, second, third and fourth CP beams, wherein the first and second CP beams are each independently a left-handed circularly polarized (LHCP) beam or a right-handed circularly polarized (RHCP) beam, and further wherein the third CP beam follows the direction of polarization of the first CP beam and the fourth CP beam follows the direction of polarization of the second CP beam.

The method may further comprise performing amplitude quantization of the CP beams using the physical IC in each sub-array, wherein the amplitude quantization is implemented by selecting a cut-off value of amplitude to achieve a distribution of amplitudes with less tapering and normalizing the distribution of amplitudes to a new reference value based on the cut-off value.

BRIEF DESCRIPTION OF THE DRAWINGS

Example embodiments of the invention will be better understood and readily apparent to one of ordinary skill in the art from the following written description, by way of example only, and in conjunction with the drawings, in which.

DETAILED DESCRIPTION

Example, non-limiting embodiments may provide an array antenna and a method of generating CP beams.

In various embodiments, the terms "sub-array" and "physical sub-array" are used to describe a sub-array having its own physical IC, wherein antenna elements of said sub-array are communicatively coupled to the physical IC via a plurality of feed lines. In various embodiments, the term "virtual sub-array" is used to describe a sub-array that is formed between neighboring physical sub-arrays, wherein the virtual sub-array does not have its own physical IC, and wherein antenna elements of the virtual sub-array are formed from antenna elements of neighboring physical sub-arrays, the antenna elements communicatively coupled to physical ICs of said neighboring physical sub-arrays.

In various embodiments, the term "beam" as used herein may be understood to refer to a composite or combined beam. That is, when referring to a single physical sub-array or virtual sub-array, even though first or second beams are mentioned, it will be appreciated that respective beams from each antenna element may be combined to form the said first or second beams. Similarly, beams from multiple physical sub-arrays and/or virtual sub-arrays may be combined to form a composite or combined beam.

Figure 1:
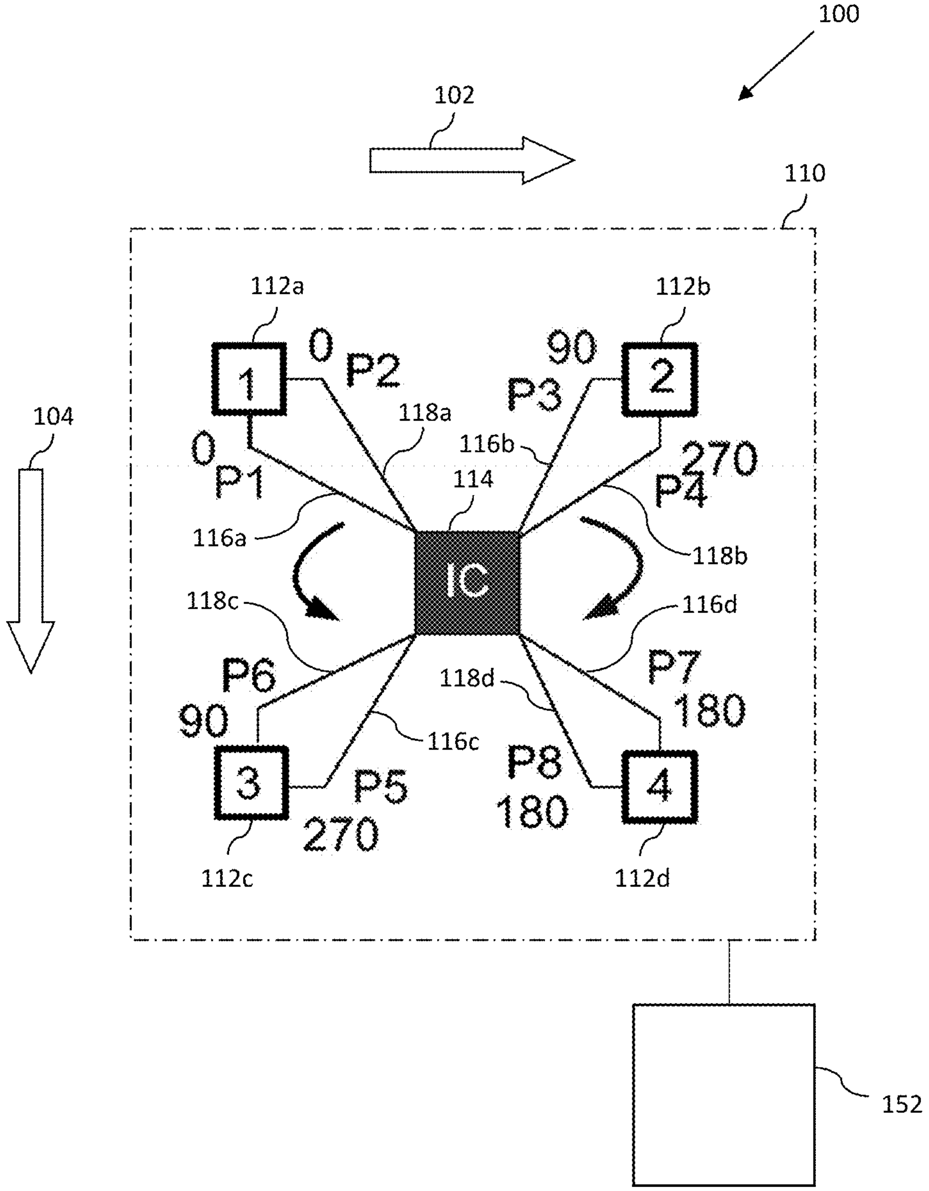
FIG. 1 is a schematic diagram of a sub-array antenna comprising an IC and 4 antenna elements, e.g., dual-feed linearly polarized antenna elements, with a sequentially rotated feeding manner for dual-beam CP radiation in an example embodiment.

FIG. 1 is a schematic diagram of a sub-array antenna (100) comprising an IC (114) and 4 antenna elements, e.g., dual-feed linearly polarized antenna elements (112*a*, 112*b*, 112*c*, 112*d*), with a sequentially rotated feeding manner for dual-beam CP radiation in an example embodiment. The sub-array antenna (100) comprises a sub-array (110) and a processing module (152) coupled to the sub-array (110). For illustration, only one sub-array (110) is shown in FIG. 1. It will be appreciated that an array antenna may comprise a plurality of sub-arrays constructed in a substantially similar manner as the sub-array (110).

In the example embodiment, the sub-array (110) comprises a plurality of antenna elements (112*a*, 112*b*, 112*c*, 112*d*), each antenna element (e.g., 112*a*) comprising a first feeding port (e.g., P1, P3, P5, P7) and a second feeding port (e.g., P2, P4, P6, P8). The sub-array (110) further comprises a physical integrated circuit (IC) (114) comprising a plurality of first and second output channels. The sub-array (110) further comprises a first feeding network comprising a plurality of first feed lines (116*a*, 116*b*, 116*c*, 116*d*) communicatively coupling each of the first output channels of the physical IC (114) to a first feeding port of each of the plurality of antenna elements (112*a*, 112*b*, 112*c*, 112*d*). The sub-array (110) further comprises a second feeding network comprising a plurality of second feed lines (118*a*, 118*b*, 118*c*, 118*d*) communicatively coupling each of the second output channels of the physical IC (114) to a second feeding port of each of the plurality of antenna elements (112*a*, 112*b*, 112*c*, 112*d*). The physical IC (114) is configured to excite the plurality of antenna elements (112*a*, 112*b*, 112*c*, 112*d*) via the first feeding network to generate a first circularly polarized (CP) beam and to excite the plurality of antenna elements (112*a*, 112*b*, 112*c*, 112*d*) via the second feeding network to generate a second CP beam. It will be appreciated that for an array antenna comprising a plurality of sub-arrays (e.g., 110), the respective first CP beams from each of the plurality of sub-arrays (e.g., 110) combine to form a first combined CP beam, and the respective second CP beams from each of the plurality of sub-arrays (e.g., 110) combine to form a second combined CP beam.

In the example embodiment, the sub-array (110) comprises four antenna elements arranged in a 2×2 grid or square lattice configuration having a first direction (102) and a second direction (104), wherein the second direction (104) is substantially perpendicular to the first direction (102). The sub-array (110) comprises a first antenna element (112*a*), a second antenna element (112*b*) positioned adjacent to the first antenna element (112*a*) along the first direction (102), a third antenna element (112*c*) positioned adjacent to the first antenna element (112*a*) along the second direction (104), and a fourth antenna element (112*d*) positioned adjacent to the second antenna element (112*b*) along the second direction (104). The four antenna elements (112*a*, 112*b*, 112*c*, 112*d*) are positioned at four corners/vertices of the square lattice configuration. Any two immediately adjacent antenna elements (e.g., between 112*a* and 112*b*, between 112*c* and 112*d*) positioned along the first direction (102) and any two immediately adjacent antenna elements (e.g., between 112*a* and 112*c*, between 112*b* and 112*d*) positioned along the second direction (104) may be separated by a distance of about 0.5λ, where A represents a free space wavelength of the first or second CP beam. In the example embodiment, the said distance between immediately adjacent antenna elements may be about 0.5λ or more (i.e., ≥0.5λ), or about 0.5λ or less (i.e., ≤0.5λ). However, it will be appreciated that the performance of an array antenna may be degraded, the further the said distance between immediately adjacent antenna elements deviates from 0.5λ. It will be appreciated that the array antenna (100) may be a planar array antenna. In other words, the plurality of antenna elements (112*a*, 112*b*, 112*c*, 112*d*) are arranged in a two-dimensional (2D) manner and are positioned substantially within the same plane.

In the example embodiment, the first and second feeding ports (e.g., P1 and P2) of each antenna element (e.g., 112*a*) in the sub-array (110) may be orthogonally orientated with respect to each other. That is, the first feeding port (P1) and the second feeding port (P2) of the first antenna element (112*a*), the first feeding port (P3) and the second feeding port (P4) of the second antenna element (112*b*), the first feeding port (P5) and the second feeding port (P6) of the third antenna element (112*c*), and the first feeding port (P7) and the second feeding port (P8) of the fourth antenna element (112*d*) may be orthogonally orientated with respect to each other.

In the example embodiment, any two antenna elements that are immediately adjacent to each other along the first direction (102) and second direction (104) may be orientated such that one antenna element is rotated at an angle of 90° with respect to the other antenna element to facilitate the connections, e.g., of the feed lines, to the IC. For example, the second antenna element (112*b*) may be clockwise rotated at an angle of 90° with respect to the first antenna element (112*a*). The fourth antenna element (112*d*) may be clockwise rotated at an angle of 90° with respect to the second antenna element (112*b*). The third element (112*c*) may be clockwise rotated at an angle of 90° with respect to the fourth antenna element (112*d*). The first element (112*a*) may be clockwise rotated at an angle of 90° with respect to the third antenna element (112*c*).

In the example embodiment, the physical IC (114) for feeding the plurality of antenna elements may be a multi-channel IC, e.g., 8-channel IC. The physical IC (114) may be positioned at a center of the sub-array (110) such that it is substantially equidistant from the four antenna elements (112*a*, 112*b*, 112*c*, 112*d*). The physical IC (114) may be positioned at a center of the sub-array (110) such that the plurality of first feed lines (116*a*, 116*b*, 116*c*, 116*d*) and second feed lines (118*a*, 118*b*, 118*c*, 118*d*) have substantially equal length. The physical IC (114) may lie, or be positioned, within the same plane as, or a different plane than the plurality of antenna elements (112*a*, 112*b*, 112*c*, 112*d*). In the example embodiment, the physical IC (114) is equidistant from the four antenna elements (112$a$, 112$b$, 112$c$, 112$d$) of the sub-array (110), such that phase and amplitude of the signals provided by the physical IC (114) to the antenna elements (112$a$, 112$b$, 112$c$, 112$d$) can advantageously be more easily controlled, in order for the CP beams to be produced. In the example embodiment, calibration can be applied when the respective distances of the physical IC (114) to the four antenna elements (112$a$, 112$b$, 112$c$, 112$d$) are not equal.

In the example embodiment, the processing module (152) may be configured to control various components and parameters of the sub-array antenna (100). The processing module (152) may be communicatively coupled to the physical IC (114) of the sub-array (110). The processing module (152) may be communicatively coupled to the physical ICs (e.g., 114) of a plurality of sub-arrays (e.g., 110). The processing module (152) may be configured to receive and transmit signals for operating the sub-array antenna (100). The processing module (152) may be configured to coordinate between the physical ICs (e.g., 114) of the plurality of sub-arrays (e.g., 110). For example, the processing module (152) may be configured to control an amplitude and phase of excitation of the antenna elements (112$a$, 112$b$, 112$c$, 112$d$). For example, the processing module (152) may be configured to control steering directions and power distribution, e.g., angles and gains, of the CP beams.

In the example embodiment, the sub-array antenna (100) may be configured to operate as a dual-beam sequentially rotated CP array antenna. The sub-array antenna (100) comprising the sub-array (110) may be configured to generate two CP beams simultaneously with controlled polarization, namely, any combination of LHCP and RHCP. For example, the first feeding ports P1/P3/P7/P5 may be fed with an amplitude/phase configuration of (1/0°, 1/90°, 1/180°, 1/270°) respectively, to generate the first CP beam, e.g., LHCP beam. For example, the second feeding ports of P2/P4/P8/P6 may be fed with an amplitude/phase configuration of (1/0°, 1/270°, 1/180°, 1/90°) respectively, to generate the second CP beam, e.g., RHCP beam. Accordingly, by feeding the first feeding ports P1/P3/P7/P5 with the amplitude/phase configuration of ($1/0°-\theta_1$, $1/90°-\theta_2$, $1/180°-\theta_3$, $1/270°-\theta_4$) respectively, and by feeding the second feeding ports of P2/P4/P8/P6 with the amplitude/phase configuration of ($1/0°-\varphi_1$, $1/270°-\varphi_2$, $1/180°-\varphi_3$, $1/90°-\varphi_4$) respectively, the sub-array (110) may operate as a dual-beam CP sub-array antenna generating two beams pointing to different angles simultaneously, the first CP beam being a LHCP beam and the second CP beam being a RHCP beam. Because of the broad beamwidths of the sub-array (110), the two CP beams can be mixed. The additional $\theta_{1,2,3,4}$ and $\varphi_{1,2,3,4}$ are phase offsets for the feeding ports P2/P4/P8/P6 and P1/P3/P7/P5, respectively, and are configured to compensate the phase offsets produced by the locations of the elements at different looking angles. It will be appreciated that by changing the phase configuration of the feeding ports, the polarization of the beams can be controlled. The beams may have the same polarization such as LHCP/LHCP and RHCP/RHCP or may have opposite polarization such LHCP/RHCP and RHCP/LHCP. While the example embodiment describes one combination of angles (0°, 90°, 180° and) 270° with 90° phase difference, it will be appreciated that other combination of angles can be used with 90° phase difference, such as 30°, 120°, 210° and 300°.

In the example embodiment, the sub-array antenna (100) may advantageously be capable of generating two independently controlled steering CP beams simultaneously with full utilization of an antenna aperture, which enables simultaneous communications to multiple satellites with enhanced system efficiency.

Figure 2A:
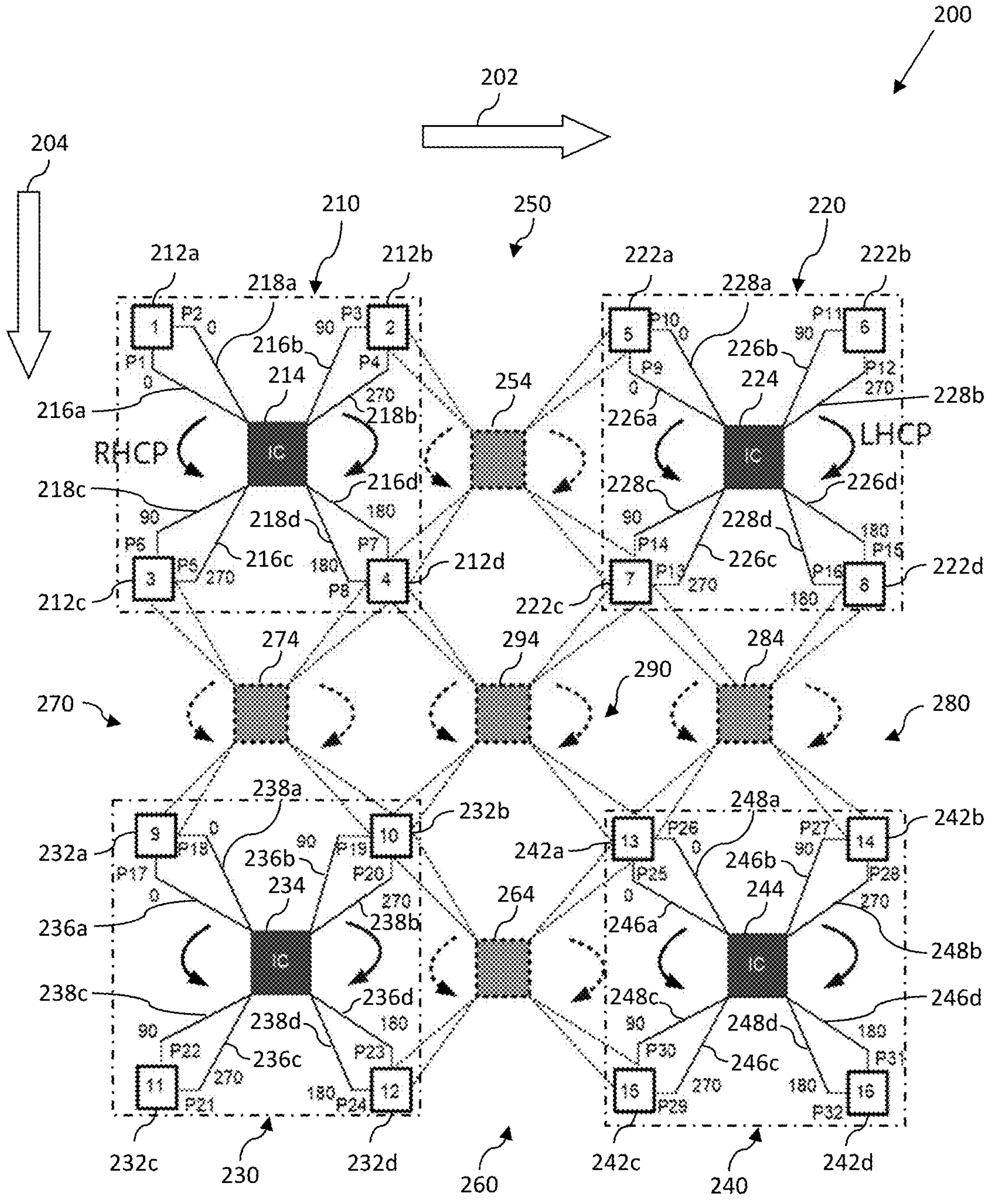
FIG. 2A is a schematic diagram of an array antenna in an example embodiment.
Figure 2B:
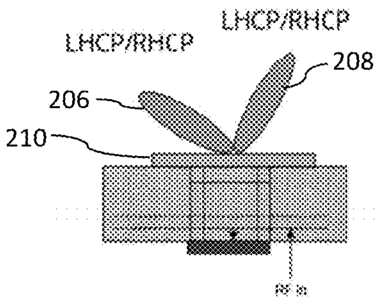
FIG. 2B is a schematic diagram showing a side view of the array antenna in the example embodiment.

FIG. 2A is a schematic diagram of an array antenna (200) in an example embodiment. The array antenna (200) comprises a plurality of sub-arrays/physical sub-arrays (210, 220, 230, 240). For illustration, the array antenna (200) comprises four sub-arrays, i.e., a first sub-array (210), a second sub-array (220), a third sub-array (230), and a fourth sub-array (240). FIG. 2B is a schematic diagram showing a side view of the array antenna (200) in the example embodiment. It will be appreciated that in various embodiments as disclosed herein, the array antenna is not limited to four sub-arrays and may comprise more than or less than four-sub-arrays.

In the example embodiment, each sub-array (e.g., 210) of the plurality of sub-arrays (210, 220, 230, 240) comprises a plurality of antenna elements (e.g., 212$a$, 212$b$, 212$c$, 212$d$), each antenna element (e.g., 212$a$) comprising a first feeding port (e.g., P1, P3, P5, P7) and a second feeding port (e.g., P2, P4, P6, P8). Each sub-array (e.g., 210) further comprises a physical integrated circuit (IC) (e.g., 214) comprising a plurality of first and second output channels. Each sub-array (e.g., 210) further comprises a first feeding network comprising a plurality of first feed lines (e.g., 216$a$, 216$b$, 216$c$, 216$d$) communicatively coupling each of the first output channels of the physical IC (e.g., 214) to a first feeding port of each of the plurality of antenna elements (e.g., 212$a$, 212$b$, 212$c$, 212$d$). Each sub-array (e.g., 210) further comprises a second feeding network comprising a plurality of second feed lines (e.g., 218$a$, 218$b$, 218$c$, 218$d$) communicatively coupling each of the second output channels of the physical IC (e.g., 214) to a second feeding port of each of the plurality of antenna elements (e.g., 212$a$, 212$b$, 212$c$, 212$d$). The physical IC (e.g., 214) of each sub-array (e.g., 210) is configured to excite the plurality of antenna elements (e.g., 212$a$, 212$b$, 212$c$, 212$d$) via the first feeding network to generate a first CP beam and to excite the plurality of antenna elements (e.g., 212$a$, 212$b$, 212$c$, 212$d$) via the second feeding network to generate a second CP beam. The respective first CP beams from each of the plurality of sub-arrays (e.g., 210) combine to form a first combined CP beam (206), and the respective second CP beams from each of the plurality of sub-arrays (e.g., 210) combine to form a second combined CP beam (208) (see FIG. 2B).

In the example embodiment, each sub-array (e.g., 210) comprises four antenna elements arranged in a 2×2 grid or square lattice configuration having a first direction (202) and a second direction (204), wherein the second direction (204) is substantially perpendicular to the first direction (202). Each sub-array (e.g., 210) comprises a first antenna element (e.g., 212$a$), a second antenna element (212$b$) positioned adjacent to the first antenna element (212$a$) along the first direction (202), a third antenna element (212$c$) positioned adjacent to the first antenna element (212$a$) along the second direction (204), and a fourth antenna element (212$d$) positioned adjacent to the second antenna element (212$b$) along the second direction (204). The four antenna elements (212$a$, 212$b$, 212$c$, 212$d$) are positioned at four corners/vertices of the square lattice configuration. Any two immediately adjacent antenna elements (e.g., between 212$a$ and 212$b$, between 212$c$ and 212$d$) positioned along the first direction (202) and any two immediately adjacent antenna elements (e.g., between 212$a$ and 212$c$, between 212$b$ and 212$d$) positioned along the second direction (204) may be separated by a distance of about 0.5λ, where λ represents a free space wavelength of the first or second CP beam. It will be appreciated that the array antenna (200) may be a planar array antenna. In other words, the plurality of antenna elements (e.g., 212*a*, 212*b*, 212*c*, 212*d*) are arranged in a two-dimensional (2D) manner and are positioned substantially within the same plane.

In the example embodiment, the first and second feeding ports (e.g., P1 and P2) of each antenna element (e.g., 212*a*) in each sub-array (e.g., 210) are orthogonally orientated with respect to each other. In other words, each antenna element (e.g., 212*a*) has two orthogonal feeding ports (e.g., P1 and P2). Using the first sub-array (210) as an example, the first feeding port (P1) and the second feeding port (P2) of the first antenna element (212*a*), the first feeding port (P3) and the second feeding port (P4) of the second antenna element (212*b*), the first feeding port (P5) and the second feeding port (P6) of the third antenna element (212*c*), and the first feeding port (P7) and the second feeding port (P8) of the fourth antenna element (212*d*) are orthogonally orientated with respect to each other.

In the example embodiment, any two antenna elements that are immediately adjacent to each other along the first direction (202) and second direction (204) are orientated such that one antenna element is rotated at an angle of 90° with respect to the other antenna element to facilitate the connections to the ICs. For example, the second antenna element (212*b*) is clockwise rotated by an angle of 90° with respect to the first antenna element (212*a*). The fourth antenna element (212*d*) is clockwise rotated by an angle of 90° with respect to the second antenna element (212*b*). The third element (212*c*) is clockwise rotated by an angle of 90° with respect to the fourth antenna element (212*d*). The first element (212*a*) is clockwise rotated by an angle of 90° with respect to the third antenna element (212*c*).

In the example embodiment, the physical IC (e.g., 214) for feeding the plurality of antenna elements in each sub-array (e.g., 210) is a multi-channel IC, e.g., 8-channel IC. Using the first sub-array (210) as an example, the physical IC, i.e., first physical IC (214) may be positioned at a center of the sub-array (210) such that it is substantially equidistant from the four antenna elements (212*a*, 212*b*, 212*c*, 212*d*). The physical IC (214) may be positioned at a center of the sub-array (210) such that the plurality of first feed lines (216*a*, 216*b*, 216*c*, 216*d*) and second feed lines (218*a*, 218*b*, 218*c*, 218*d*) have substantially equal length. The physical IC (214) may lie, or be positioned, within the same plane as, or different plane than the plurality of antenna elements (212*a*, 212*b*, 212*c*, 212*d*). In the example embodiment, the physical IC (214) is equidistant from the four antenna elements (212*a*, 212*b*, 212*c*, 212*d*) of the sub-array (210), such that phase and amplitude of the signals provided by the physical IC (214) to the antenna elements (212*a*, 212*b*, 212*c*, 212*d*) can advantageously be more easily controlled, in order for the CP beams to be produced. When the respective distances of the physical IC (214) from the antenna elements (212*a*, 212*b*, 212*c*, 212*d*) are not equal, additional calibration is applied.

In the example embodiment, the configuration of the first sub-array (210) is replicated for the second sub-array (220), third sub-array (230) and fourth sub-array (240).

The second sub-array (220) comprises a plurality of antenna elements (222*a*, 222*b*, 222*c*, 222*d*), a second physical IC (224) comprising a plurality of first and second output channels, a first feeding network comprising a plurality of first feed lines (226*a*, 226*b*, 226*c*, 226*d*) communicatively coupling each of the first output channels of the second physical IC (224) to a first feeding port of each of the plurality of antenna elements, and a second feeding network comprising a plurality of second feed lines (228*a*, 228*b*, 228*c*, 228*d*) communicatively coupling each of the second output channels of the second physical IC (224) to a second feeding port of each of the plurality of antenna elements (222*a*, 222*b*, 222*c*, 222*d*).

The third sub-array (230) comprises a plurality of antenna elements (232*a*, 232*b*, 232*c*, 232*d*), a third physical IC (234) comprising a plurality of first and second output channels, a first feeding network comprising a plurality of first feed lines (236*a*, 236*b*, 236*c*, 236*d*) communicatively coupling each of the first output channels of the third physical IC (234) to a first feeding port of each of the plurality of antenna elements, and a second feeding network comprising a plurality of second feed lines (238*a*, 238*b*, 238*c*, 238*d*) communicatively coupling each of the second output channels of the third physical IC (234) to a second feeding port of each of the plurality of antenna elements (232*a*, 232*b*, 232*c*, 232*d*).

The fourth sub-array (240) comprises a plurality of antenna elements (242*a*, 242*b*, 242*c*, 242*d*), a fourth physical IC (244) comprising a plurality of first and second output channels, a first feeding network comprising a plurality of first feed lines (246*a*, 246*b*, 246*c*, 246*d*) communicatively coupling each of the first output channels of the fourth physical IC (244) to a first feeding port of each of the plurality of antenna elements, and a second feeding network comprising a plurality of second feed lines (248*a*, 248*b*, 248*c*, 248*d*) communicatively coupling each of the second output channels of the fourth physical IC (244) to a second feeding port of each of the plurality of antenna elements (242*a*, 242*b*, 242*c*, 242*d*).

In the example embodiment, the plurality of antenna elements (e.g., 212*a*, 212*b*, 212*c*, 212*d*) in all the plurality of sub-arrays (210, 220, 230, 240) are collectively arranged in a grid configuration or square lattice configuration having the first direction (202) and the second direction (204), wherein the second direction (204) is substantially perpendicular to the first direction (202). In the example embodiment, any two immediately adjacent antenna elements (e.g., between 212*a* and 212*b*, between 212*b* and 222*a*) positioned along the first direction (202) and any two immediately adjacent antenna elements (e.g., between 212*a* and 212*c*, between 212*c* and 232*a*) positioned along the second direction (204) may be separated by a distance of about 0.5λ, where λ represents a free space wavelength of the first or second CP beam (206, 208). As shown in FIG. 2A, there is a total of 16 antenna elements, each having two orthogonal feeding ports, arranged in a 4×4 square lattice configuration, where the spacing of the antenna elements is half wavelength at an operating frequency. The antenna elements are connected to 4 physical ICs (214, 224, 234, 244) respectively for excitation. Each IC (e.g., 214) has 8 channels with phase and amplitude controls.

In the example embodiment, the array antenna (200) further comprises one or more virtual sub-arrays (e.g., 250, 260, 270, 280, 290), each virtual sub-array (e.g., 250) comprising antenna elements of neighboring sub-arrays (e.g., 210, 220), wherein the physical ICs (e.g., 214, 224) of the neighboring sub-arrays (e.g., 210, 220) are configured to respectively excite the antenna elements (e.g., 212*b*, 222*a*, 212*d*, 222*c*) of the virtual sub-array (e.g., 250) to generate a third and/or fourth CP beam. In the example embodiment, the physical ICs (e.g., 214, 224) of the neighboring sub-arrays (e.g., 210, 220) are respectively configured to adjust an amplitude and a phase of excitation of respective antenna elements coupled thereto, in order to generate the third and/or fourth CP beams. In the example embodiment, each of the virtual sub-arrays comprises four antenna elements arranged in a 2×2 square lattice configuration. In the example embodiment, the generated third CP beam contributes to the first combined CP beam (206), and the generated fourth CP beam contributes to the second combined CP beam (208). In the example embodiment, the third CP beam may have the same characteristics as the first CP beam and the fourth CP beam may have the same characteristics as the second CP beam. For example, the third CP beam may have the same direction of polarization as the first beam, and the fourth CP beam may have the same direction of polarization as the second beam. In the example embodiment, the third CP beams are combined with the first CP beams to form the first combined CP beam, and the fourth CP beams are combined with the second CP beams to form the second combined CP beam. The first and second combined beams are produced with suppressed grating lobes with the complementary contribution from virtual sub-arrays (i.e., the first combined CP beam (206) and the second combined CP beam (208)).

In the example embodiment, the virtual sub-array may be formed from antenna elements from two sub-arrays that are adjacent to each other along the first direction (202) or the second direction (204), said antenna elements of the virtual sub-array immediately adjacent to each other within the square lattice. In other words, for any two sub-arrays that are immediately adjacent to each other along the first direction (202), a virtual sub-array may be formed between the two sub-arrays, said virtual sub-array comprising the first and third antenna elements belonging to one of the two sub-arrays, and the second and fourth antenna elements belonging to the other of the two sub-arrays. In other words, for any two sub-arrays that are immediately adjacent to each other along the second direction (204), a virtual sub-array may be formed between the two sub-arrays, said virtual sub-array comprising the first and second antenna elements belonging to one of the two sub-arrays, and the third and fourth antenna elements belonging to the other of the two sub-arrays.

In one example, the first sub-array 210 and the second sub-array 220 are neighboring sub-arrays or immediately adjacent to each other along the first direction (202). A fifth virtual sub-array (250) may be formed between the first sub-array (210) and the second sub-array (220), said fifth virtual sub-array (250) comprising antenna elements of the first sub-array (210) and antenna elements of the second sub-array (220) that are immediately adjacent to each other along the first direction (202).

Specifically, the fifth virtual sub-array (250) comprises:

- the second antenna element (212*b*) of the first sub-array (210),
- the fourth antenna element (212*d*) of the first sub-array (210), said fourth antenna element (212*d*) positioned adjacent to the second antenna element (212*b*) of the first sub-array (210) along the second direction (204),
- the first antenna element (222*a*) of the second sub-array (220), said first antenna element (222*a*) positioned adjacent to the second antenna element (212*b*) of the first sub-array (210) along the first direction (202), and
- the third antenna element (222*c*) of the second sub-array (220), said third antenna element (222*c*) positioned adjacent to the fourth antenna element (212*d*) of the first sub-array (210) along the first direction (202).

The fifth virtual sub-array (250) may be configured to be excited by re-weighting an output phase and amplitude of the first physical IC (214) of the first sub-array (210) and the second physical IC (224) of the second sub-array (220). In this case, although the fifth virtual sub-array (250) does not have its own physical IC, the fifth virtual sub-array (250) may be considered to be fed by a fifth virtual IC (254) contributed by excitations from the first physical IC (214) and second physical IC (224).

Similarly, a sixth virtual sub-array (260) may be formed between the third sub-array (230) and the fourth sub-array (240) that are neighboring or immediately adjacent to each other along the first direction (202), said sixth virtual sub-array (260) comprising antenna elements of the third sub-array (230) and antenna elements of the fourth sub-array (240) that are immediately adjacent to each other along the first direction (202).

Specifically, the sixth virtual sub-array (260) comprises:

- the second antenna element (232*b*) of the third sub-array (230),
- the fourth antenna element (232*d*) of the third sub-array (230), said fourth antenna element (232*d*) positioned adjacent to the second antenna element (232*b*) of the third sub-array (230) along the second direction (204),
- the first antenna element (242*a*) of the fourth sub-array (240), said first antenna element (242*a*) positioned adjacent to the second antenna element (232*b*) of the third sub-array (230) along the first direction (202), and
- the third antenna element (242*c*) of the fourth sub-array (240), said third antenna element (242*c*) positioned adjacent to the fourth antenna element (232*d*) of the third sub-array (230) along the first direction (202).

The sixth virtual sub-array (260) may be configured to be excited by re-weighting an output phase and amplitude of the third physical IC (234) of the third sub-array (230) and the fourth physical IC (244) of the fourth sub-array (240). In this case, although the sixth virtual sub-array (260) does not have its own physical IC, the sixth virtual sub-array (260) may be considered to be fed by a sixth virtual IC (264) contributed by excitations from the third physical IC (234) and fourth physical IC (244).

In another example, the first sub-array (210) and the third sub-array (230) are neighboring sub-arrays or immediately adjacent to each other along the second direction (204). A seventh virtual sub-array (270) may be formed between the first sub-array (210) and the third sub-array (230), said seventh virtual sub-array (270) comprising antenna elements of the first sub-array (210) and antenna elements of the third sub-array (230) that are immediately adjacent to each other along the second direction (204).

Specifically, the seventh virtual sub-array (270) comprises:

- the third antenna element (212*c*) of the first sub-array (210),
- the fourth antenna element (212*d*) of the first sub-array (210), said fourth antenna element (212*d*) positioned adjacent to the third antenna element (212*c*) of the first sub-array (210) along the first direction (202),
- the first antenna element (232*a*) of the third sub-array (230), said first antenna element (232*a*) positioned adjacent to the third antenna element (212*c*) of the first sub-array (210) along the second direction (204), and
- the second antenna element (232*b*) of the third sub-array (230), said second antenna element (232*b*) positioned adjacent to the fourth antenna element (212*d*) of the first sub-array (210) along the second direction (204).

The seventh virtual sub-array (270) may be configured to be excited by re-weighting an output phase and amplitude of the first physical IC (214) of the first sub-array (210) and the third physical IC (234) of the third sub-array (230). In this case, although the seventh virtual sub-array (270) does not have its own physical IC, the seventh virtual sub-array (270)

may be considered to be fed by a seventh virtual IC (274) contributed by excitations from the first physical IC (214) and third physical IC (234).

Similarly, an eighth virtual sub-array (280) may be formed between the second sub-array (220) and the fourth sub-array (240) that are neighboring or immediately adjacent to each other along the second direction (204), said eighth virtual sub-array (280) comprising antenna elements of the second sub-array (220) and antenna elements of the fourth sub-array (240) that are immediately adjacent to each other along the second direction (204).

Specifically, the eighth virtual sub-array (280) comprises:

- the third antenna element (222*c*) of the second sub-array (220),
- the fourth antenna element (222*d*) of the second sub-array (220), said fourth antenna element (222*d*) positioned adjacent to the third antenna element (222*c*) of the second sub-array (220) along the first direction (202),
- the first antenna element (242*a*) of the fourth sub-array (240), said first antenna element (242*a*) positioned adjacent to the third antenna element (222*c*) of the second sub-array (220) along the second direction (204), and
- the second antenna element (242*b*) of the fourth sub-array (240), said second antenna element (242*b*) positioned adjacent to the fourth antenna element (222*d*) of the second sub-array (220) along the second direction (204).

The eighth virtual sub-array (280) may be configured to be excited by re-weighting an output phase and amplitude of the second physical IC (224) of the second sub-array (220) and the fourth physical IC (244) of the fourth sub-array (240). In this case, although the eighth virtual sub-array (280) does not have its own physical IC, the eighth virtual sub-array (280) may be considered to be fed by an eighth virtual IC (284) contributed by excitations from the second physical IC (224) and fourth physical IC (244).

In the example embodiment, the virtual sub-array may be formed from antenna elements from four sub-arrays that are arranged in a 2×2 configuration, said antenna elements of the virtual sub-array immediately adjacent to each other within the square lattice. Although FIG. 2A illustrates an array antenna (200) with 4 sub-arrays (or 16 antenna elements), it will be appreciated that for an array antenna comprising more than 4 sub-arrays (or 16 antenna elements), the virtual sub-array may be formed from antenna elements from any four sub-arrays that are arranged in a 2×2 configuration.

As illustrated in FIG. 2A, a ninth virtual sub-array (290) may be formed between the first sub-array (210), second sub-array (220), third sub-array (230), and fourth sub-array (240). The ninth virtual sub-array (290) comprises:

- the fourth antenna element (212*d*) of the first sub-array (210),
- the third antenna element (222*c*) of the second sub-array (220), said third antenna element (222*c*) positioned adjacent to the fourth antenna element (212*d*) of the first sub-array (210) along the first direction (202),
- the second antenna element (232*b*) of the third sub-array (230), said second antenna element (232*b*) positioned adjacent to the fourth antenna element (212*d*) of the first sub-array (210) along the second direction (204), and
- the first antenna element (242*a*) of the fourth sub-array (240), said first antenna element (242*a*) positioned adjacent to the third antenna element (222*c*) of the second sub-array (220) along the second direction (204).

The ninth virtual sub-array (290) may be configured to be excited by re-weighting an output phase and amplitude of the first physical IC (214) of the first sub-array (210), second physical IC (224) of the second sub-array (220), third physical IC (234) of the third sub-array (230) and the fourth physical IC (244) of the fourth sub-array (240). In this case, although the ninth virtual sub-array (290) does not have its own physical IC, the ninth virtual sub-array (290) may be considered to be fed by a ninth virtual IC (294) contributed by excitations from the first physical IC (214), second physical IC (224), third physical IC (234) and fourth physical IC (244).

In the example embodiment, the array antenna (200) comprises a total of four physical sub-arrays (210, 220, 230, 240) and five virtual sub-arrays (250, 260, 270, 280, 290). Adjacent physical sub-arrays (i.e., 2×2 dual-beam sequentially rotated CP antenna array) (e.g., between 210 and 220, between 210 and 230) are positioned at one wavelength apart from each other and this may cause grating lobes to appear during scanning. The presence of a virtual sub-array (i.e., virtual dual-beam sequentially rotated CP antenna array) formed using virtual IC excitation may advantageously reduce the distance/spacing between antenna elements and suppress the occurrence of grating lobe during scanning. The inter-array distance/spacing between sub-arrays and virtual sub-arrays is reduced to suppress the occurrence of grating lobe during scanning. That is, each virtual sub-array in the example embodiment is separated by a distance of about 0.5λ from an immediately adjacent physical sub-array or virtual sub-array positioned along the first direction (202) or the second direction (204). For example, as shown in FIG. 2A, the fifth virtual sub-array (250) is separated by a distance of about 0.5λ from the first physical sub-array (210) and the second physical sub-array (220) along the first direction (202), as well as the ninth virtual sub-array (290) along the second direction (204). As shown in FIG. 2A, the antenna element 2/5/7/4 is considered to be fed/controlled by the virtual IC (254) and thus formed a virtual dual-beam sequentially rotated CP antenna array. In the example embodiment, a total of 5 virtual dual-beam sequentially rotated CP antenna elements can be configured. Accordingly, a 3×3 dual-beam sequentially rotated CP antenna array can be achieved wherein the element spacing is half wavelength without grating lobe. It will be appreciated that the excitations of the virtual dual-beam sequentially rotated CP antenna elements are then transformed and implemented by re-weighting the phase and amplitude of the physical ICs.

It has been recognized that the amplitude weighting of the antenna excitations may degrade the antenna aperture efficiency. As such, various embodiments of the array antenna and associated method of generating CP beams disclose a quantization approach to enhance the antenna aperture efficiency for higher gain and EIRP (Effective, or Equivalent, Isotropic Radiated Power).

In the example embodiment, the physical ICs (214, 224, 234, 244) are configured to excite the plurality of antenna elements of each sub-array and virtual sub-array in a sequentially rotated manner with identical amplitude and 90° phase difference. In the example embodiment, the first and second CP beams may be simultaneously generated. In the example embodiment, the first CP beam, second CP beam, third CP beam and fourth CP beam may be simultaneously generated, wherein the third CP beam follows the direction of polarization of the first CP beam and the fourth CP beam follows the direction of polarization of the second CP beam. The first and second CP beams are each independently a left-handed circularly polarized (LHCP) beam or a right-handed circularly polarized (RHCP) beam.

During operation, two CP beams are generated by 4 adjacent antenna elements, or a 2×2 sub-array, in a sequential rotation manner. Using the first to fourth antenna elements of the first sub-array (210) as an example, the first feeding ports P1/P3/P7/P5 may be fed with an amplitude/phase configuration of (1/0°, 1/90°, 1/180°, 1/270°) respectively, to generate the first CP beam, e.g., LHCP/RHCP. The second feeding ports of P2/P4/P8/P6 may be fed with an amplitude/phase configuration of (1/0°, 1/270°, 1/180°, 1/90°) respectively, to generate the second CP beam, e.g., LHCP/RHCP. Accordingly, by feeding the feeding ports of P1/P3/P7/P5 with an amplitude/phase of (1/0°, 1/90°, 1/180°, 1/270°) and by feeding the feeding ports of P2/P4/P8/P6 with an amplitude/phase of (1/0°, 1/270°, 1/180°, 1/90°), the sub-array (210) generates a LHCP beam and a RHCP beam simultaneously. When additional phase is added to each port, the two generated beams are scanned. The 16 elements array antenna (200) can be reconfigured as a 2×2 dual-beam sequentially rotated CP antenna with such sub-arrays, with two independently controlled steering CP beams achieved by proper setting of the phase excitation. It will be appreciated that by changing the phase configuration of the feeding ports, the polarization of the beams can be controlled. The beams may have the same polarization such as LHCP/LHCP and RHCP/RHCP or may have opposite polarization such LHCP/RHCP and RHCP/LHCP.

Figure 3A:
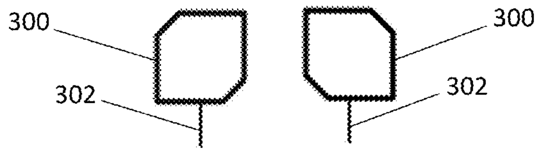
FIG. 3A is a schematic diagram of a single-feed CP antenna element in an example embodiment.
Figure 3B:
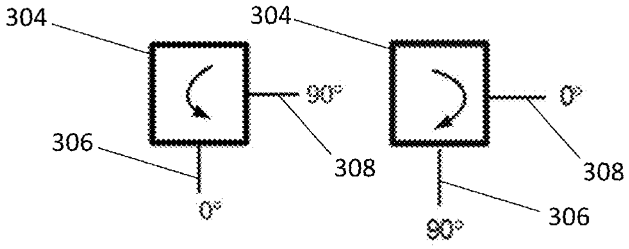
FIG. 3B is a schematic diagram of a dual-feed CP antenna element in an example embodiment.
Figure 3C:
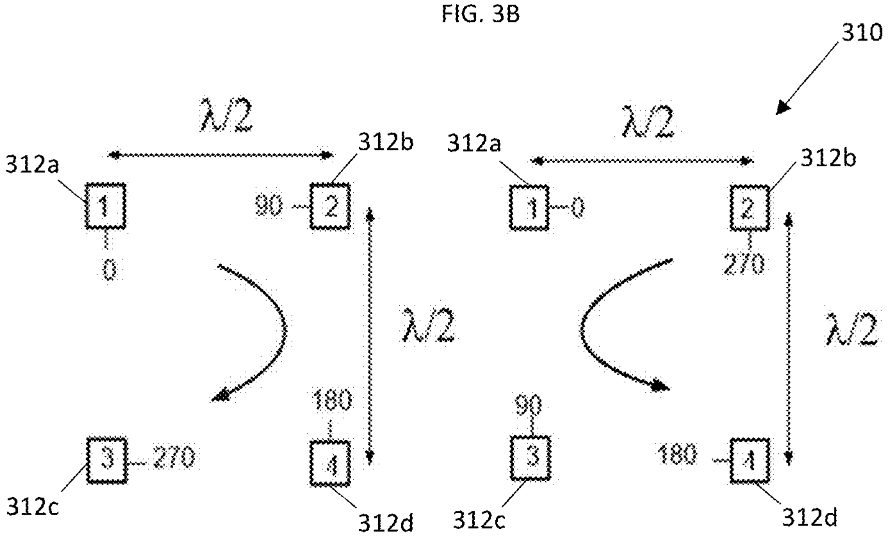
FIG. 3C is a schematic diagram of a 2×2 array antenna comprising a plurality of single-feed linearly polarized antenna elements with a sequentially rotated feeding manner for CP radiation in an example embodiment.

FIG. 3A to FIG. 3C illustrate the various configurations of CP antenna elements currently used in the art.

FIG. 3A is a schematic diagram of a single-feed CP antenna element (300) in an example embodiment. The single-feed CP antenna element (300) comprises a single feeding port (302).

FIG. 3B is a schematic diagram of a dual-feed CP antenna element (304) in an example embodiment. The dual-feed CP antenna element (304) comprises a first feeding port (306) and a second feeding port (308). As shown in FIG. 3B, the first feeding point (306) and the second feeding point (308) may be excited with quadrature phases, i.e., 90° phase difference.

FIG. 3C is a schematic diagram of a 2×2 array antenna (310) comprising a plurality of single-feed linearly polarized antenna elements, e.g., sequentially rotated CP elements (312*a*, 312*b*, 312*c*, 312*d*) with a sequentially rotated feeding manner for CP radiation in an example embodiment. The antenna array (310) comprises a first antenna element (312*a*), a second antenna element (312*b*), a third antenna element (312*c*) and a fourth antenna element (312*d*) arranged in a square lattice configuration. Adjacent antenna elements (e.g., between 312*a* and 312*b*, between 312*b* and 312*d*) are positioned/spaced apart at a distance of about λ/2, where λ represents a free space wavelength. The plurality of antenna elements (312*a*, 312*b*, 312*c*, 312*d*) may be excited in a first clockwise direction with sequentially rotated phases to produce a first CP beam, e.g., LHCP beam. The plurality of antenna elements (312*a*, 312*b*, 312*c*, 312*d*) may be excited in a second anti-clockwise direction with sequentially rotated phases to produce a second CP beam, e.g., RHCP beam.

Conventionally, a CP antenna array comprises multiple CP antenna elements with the same polarization. When the multiple CP antenna elements are properly weighted, the overall radiation is enhanced in certain direction(s). As shown in FIG. 3A to FIG. 3C, the CP antenna elements can be excited with a single feeding point, or two orthogonal feeding points with quadrature phases, or multiple feeding points with sequentially rotated phases. In general, the CP antenna element generates radiation with a fixed polarization only in one direction at a time, either LHCP or RHCP. The polarization can be adjusted at different times using methods such as switching. As such, the CP antenna array using such CP antenna elements is able to produce radiation with one fixed polarization at a time as well. Further, the polarization of the CP antenna array can be changed using method such as switching.

In contrast to the CP antenna elements currently used in the art, various embodiments of the array antenna as disclosed herein may be capable of simultaneously generating two beams (e.g., first combined CP beam (206) and second combined CP beam (208)) with specified polarizations at different directions.

Figure 4:
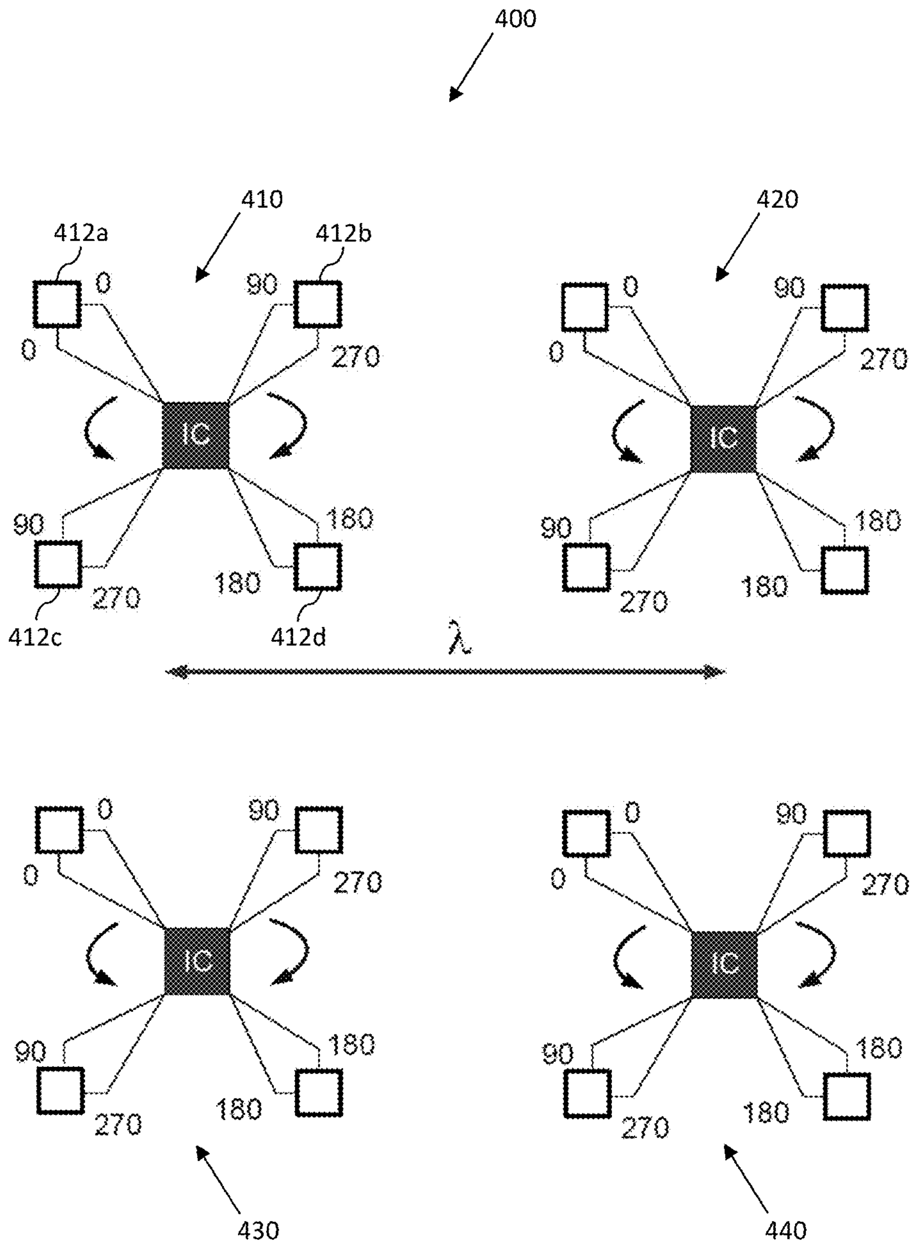
FIG. 4 is a schematic diagram of a 4×4 antenna array in an example embodiment.

FIG. 4 is a schematic diagram of a 4×4 antenna array (400) in an example embodiment. FIG. 4 exhibits a 4×4 antenna array (400) wherein 4 sub-arrays (410, 420, 430, 440) of dual-beam sequentially rotated CP antenna elements (e.g., 412*a*, 412*b*, 412*c*, 412*d*) are utilized. With proper phase arrangement, the antenna array (400) is able to generate two combined beams (e.g., compare first combined CP beam (206) and second combined CP beam (208)) with specified polarizations at different directions.

In principle, the element spacing of an antenna array should not be larger than half wavelength (in free space) to avoid the grating lobe for arbitrary scanning. With a larger element spacing, the scan range is reduced. As shown in FIG. 4, the utilization of the sub-arrays of dual-beam sequentially rotated CP antenna elements makes the sub-array spacing become one wavelength A, which causes grating lobe when antenna beams are steered.

Figure 5:
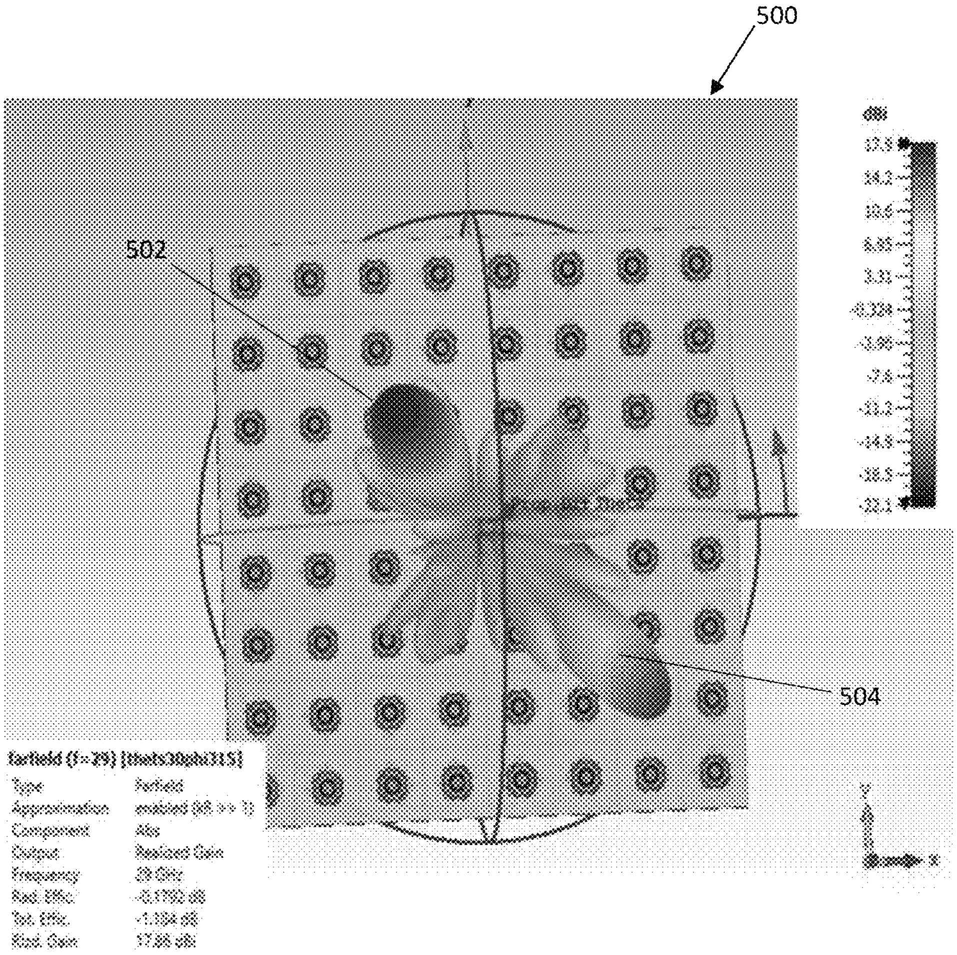
FIG. 5 is a plot of antenna/radiation patterns of a single beam antenna array with grating lobe effect in an example embodiment.

FIG. 5 is a plot (500) of antenna/radiation patterns of a single beam antenna array with grating lobe effect in an example embodiment. FIG. 5 demonstrates the grating lobe (i.e., a lobe other than the desired main lobe) of the single beam antenna array with one wavelength element spacing. When the main beam (502) is scanned to a specific angle, such as 30°, one or more beams (504) with similar strength radiating to one or more unwanted directions are formed, thereby distorting the antenna pattern significantly, which make the antenna impossible to fulfill the regulated pattern profile for satellite applications.

To suppress the grating lobe, a virtual sub-array of dual-beam sequentially rotated CP antenna element using virtual IC excitation is implemented. As shown in FIG. 2A, the antenna elements 2, 5, 7 and 4 (i.e., second antenna element (212*b*) of the first sub-array (210), first antenna element (222*a*) of the second sub-array (220), third antenna element (222*c*) of the second sub-array (220) and the fourth antenna element (212*d*) of the first sub-array (210), respectively) are considered to be fed by a virtual IC and thus formed a virtual sub-array (250) of dual-beam sequentially rotated CP antenna elements. As shown in FIG. 2A, a total of 5 virtual sub-arrays of dual-beam sequentially rotated CP antenna elements are configured for the array antenna (200). Therefore, a 3×3 dual-beam sequentially rotated CP antenna array is formed wherein the sub-array and virtual sub-array spacing is half wavelength and therefore the grating lobe is suppressed.

In the example embodiment, excitation of the virtual sub-array of dual-beam sequentially rotated CP antenna elements may be implemented by re-weighting an output phase and amplitude of the physical ICs.

Figure 6A:
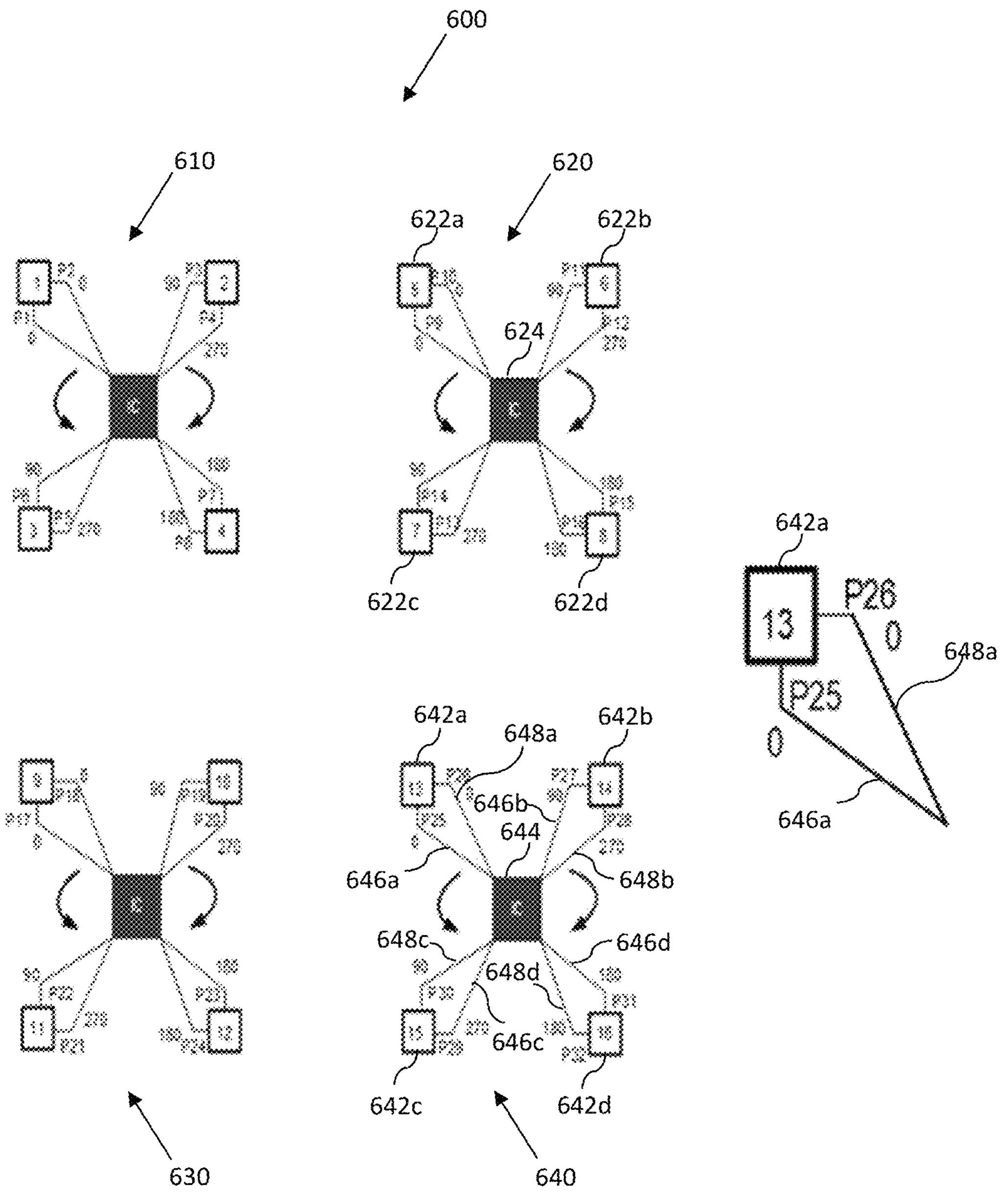
FIG. 6A is a schematic diagram of an array antenna in an example embodiment.
Figure 6B:
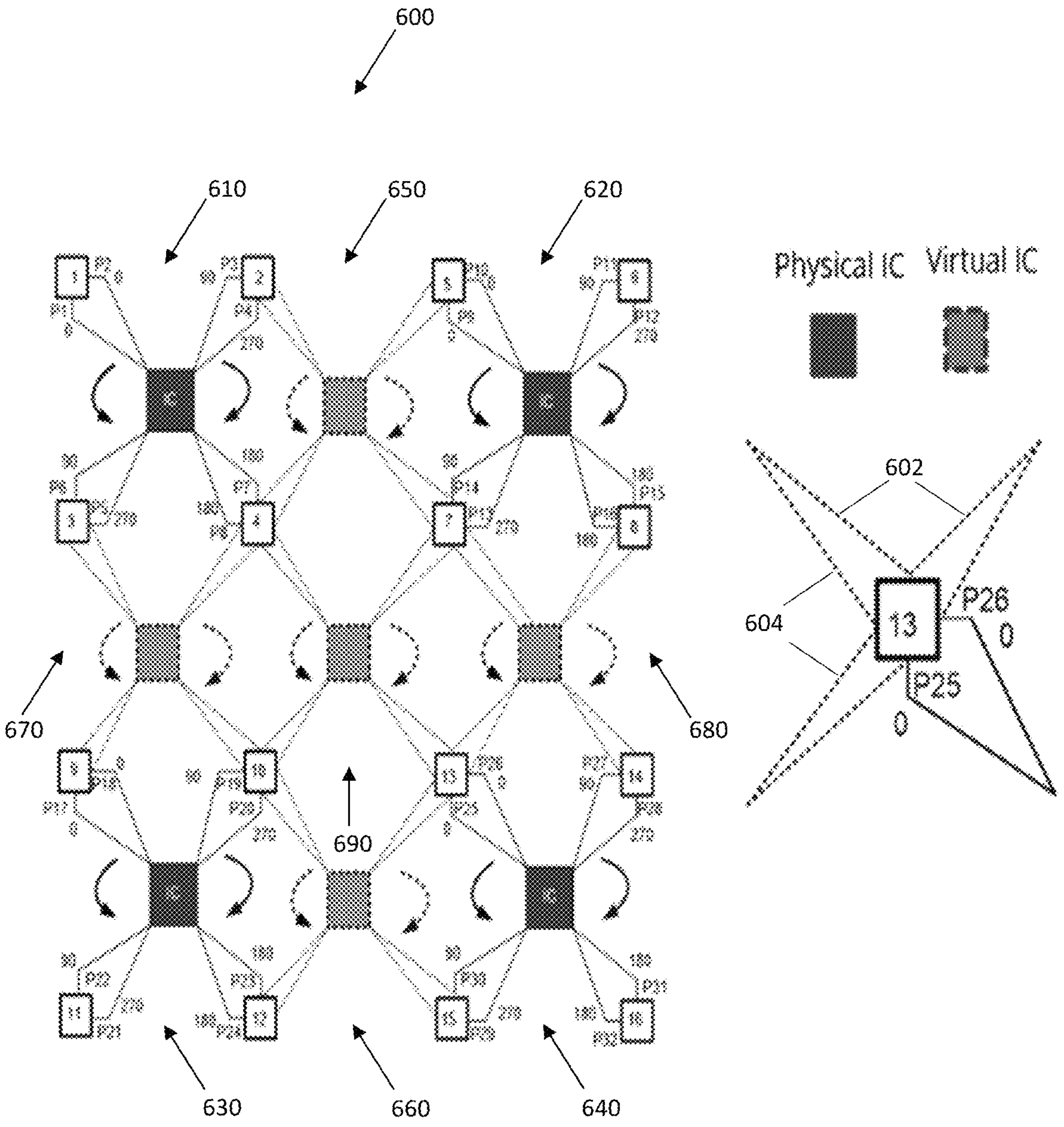
FIG. 6B is another schematic diagram of the array antenna in the example embodiment.

FIG. 6A is a schematic diagram of an array antenna (600) in an example embodiment. FIG. 6B is another schematic diagram of the array antenna (600) in the example embodiment. The array antenna (600) of FIG. 6A and FIG. 6B is substantially similar to the array antenna (200) of FIG. 2A.

The array antenna (600) comprises four sub-arrays/physical sub-arrays (610, 620, 630, 640). Each sub-array (e.g., 640) of the plurality of sub-arrays (610, 620, 630, 640) comprises four antenna elements (642*a*, 642*b*, 642*c*, 642*d*), each antenna element (e.g., 642*a*) comprising a first feeding port (e.g., P25) and a second feeding port (e.g., P26). Each sub-array (e.g., 640) further comprises a physical IC (e.g., 644) comprising a plurality of first and second output channels. Each sub-array (e.g., 640) further comprises a first feeding network comprising a plurality of first feed lines (646*a*, 646*b*, 646*c*, 646*d*) communicatively coupling each of the first output channels of the physical IC (e.g., 644) to a first feeding port of each of the plurality of antenna elements. Each sub-array (e.g., 640) further comprises a second feeding network comprising a plurality of second feed lines (648*a*, 648*b*, 648*c*, 648*d*) communicatively coupling each of the second output channels of the physical IC (e.g., 644) to a second feeding port of each of the plurality of antenna elements. The physical IC (e.g., 644) of each sub-array (e.g., 640) is configured to excite the plurality of antenna elements (642*a*, 642*b*, 642*c*, 642*d*) via the first feeding network to generate a first CP beam and to excite the plurality of antenna elements (642*a*, 642*b*, 642*c*, 642*d*) via the second feeding network to generate a second CP beam. The respective first CP beams from each of the plurality of sub-arrays (e.g., 610) form a first combined CP beam (compare first combined CP beam (206) of FIG. 2B), and the respective second CP beams from each of the plurality of sub-arrays (e.g., 610) form a second combined CP beam (compare second combined CP beam (208) of FIG. 2B).

The array antenna (600) further comprises 5 virtual sub-arrays (650, 660, 670, 680, 690), each virtual sub-array (e.g., 680) comprising antenna elements of neighboring sub-arrays (e.g., 620, 640), wherein the physical ICs (e.g., 624, 644) of the neighboring sub-arrays (e.g., 620, 640) are configured to respectively excite the antenna elements (e.g., 622*c*, 622*d*, 642*a*, 642*b*) of the virtual sub-array (e.g., 680) to generate a third and/or a fourth CP beam while reducing the sub-array spacing.

In the example embodiment, in the virtual sub-arrays (650, 660, 670, 680, 690) using virtual IC configuration, some antenna elements, for example antenna element 13 (i.e., first antenna element (642*a*) of the fourth sub-array (640)), is involved in the operation of multiple physical and virtual dual-beam sequentially rotated CP antenna elements, which results in the requirement of multiple excitations from different directions. Such excitations can be realized by phase offset and amplitude accumulation to the real/physical ICs. For example, the virtual excitations to antenna element 13 at upper side (602) can be realized by first feeding port number 25 with a phase offset of 180°. The virtual excitations to antenna element 13 at left side (604) can be realized by second feeding port number 26 with a phase offset of 180°. Accordingly, as some antenna elements contribute to multiple physical and virtual dual-beam sequentially rotated CP antenna elements, the excitations of the antenna elements may have non-uniform distribution, which leads to degraded aperture efficiency.

To address this issue of non-uniform distribution of excitations of the antenna elements and degradation of antenna aperture efficiency, various embodiments of the array antenna and associated methods of using the array antenna element to generate CP beams may further comprise a processing module (compare 152 of FIG. 1) configured to perform quantization, e.g., amplitude quantization, of the CP beams. In various embodiments, the processing module is configured to perform calculations to obtain a quantized value and the physical ICs are configured to realize the quantized value, i.e., to implement the quantization based on the quantized value. In various embodiments, amplitude quantization may be implemented by selecting a cut-off value of amplitude to achieve a distribution of amplitudes with less tapering and normalizing the distribution of amplitudes to a new reference value based on the cut-off value. By performing quantization of the CP beams, radiation efficiency of the array antenna may be enhanced.

FIG. 7A to FIG. 7D are a series of graphs showing an implementation of amplitude quantization in an example embodiment.

Figure 7A:
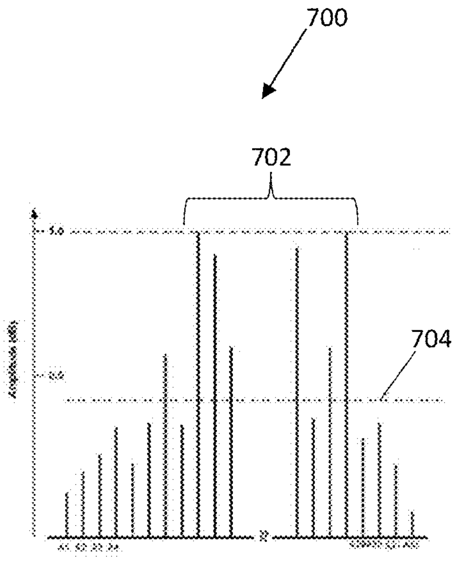
FIG. 7A is a first graph showing an original distribution of the amplitude of signals (y-axis) produced by a plurality of CP antenna elements (x-axis) in an example embodiment.

FIG. 7A is a first graph (700) showing an original distribution of the amplitude of signals (y-axis) produced by a plurality of CP antenna elements (x-axis) in the example embodiment. Strong tapering (702) is found as some antenna elements are heavily reused in multiple CP antenna elements (e.g., for excitation of both physical and virtual sub-arrays). The term "tapering" as used herein broadly refers to the manipulation of the amplitude contribution of an individual antenna element to the overall antenna response. As shown in FIG. 7A, a cut-off value (704) of amplitude is selected for distribution with less tapering.

Figure 7B:
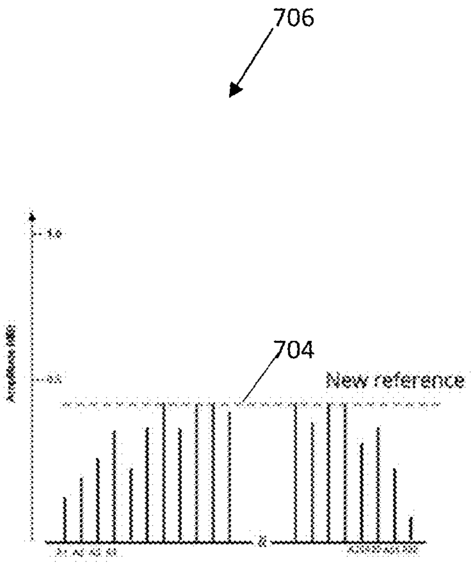
FIG. 7B is a second graph showing a truncated distribution of signals where signal values that are above the cut-off value of amplitude are removed/filtered in the example embodiment.

FIG. 7B is a second graph (706) showing a truncated distribution of signals where signal values that are above the cut-off value of amplitude are removed/filtered in the example embodiment. As shown in FIG. 7B, the cut-off value (704) of amplitude serves as a new reference amplitude.

Figure 7C:
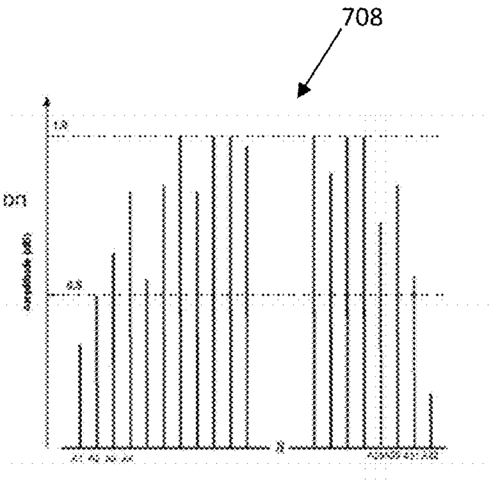
FIG. 7C is a third graph showing a scaled distribution of signals in the example embodiment.

FIG. 7C is a third graph (708) showing a scaled distribution of signals in the example embodiment. As shown in FIG. 7C, the truncated distribution of signals in FIG. 7B is scaled to the new reference amplitude.

Figure 7D:
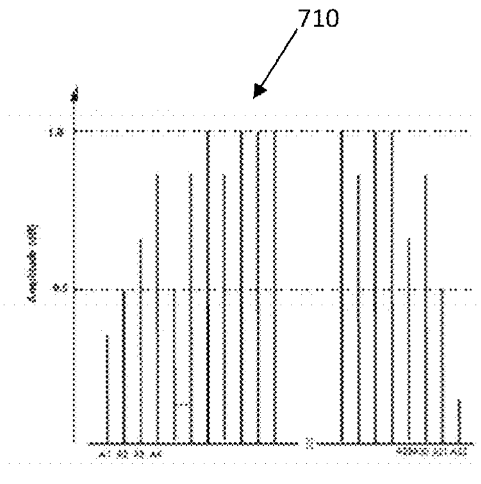
FIG. 7D is a fourth graph showing further quantization of the normalized distribution of signals in the example embodiment.

FIG. 7D is a fourth graph (710) showing further quantization of the normalized distribution of signals in the example embodiment. The quantization is determined by the IC digital attenuation resolution and range.

In the example embodiment, radiation efficiency may advantageously be enhanced by performing amplitude quantization as shown in FIG. 7A to FIG. 7D.

When two different power levels excite two beams independently, the beam with higher power has a further boosted efficiency.

In the following example embodiments as described with reference to FIG. 8 to FIG. 13, the effectiveness of the array antenna as disclosed herein will be described.

Figure 8A:
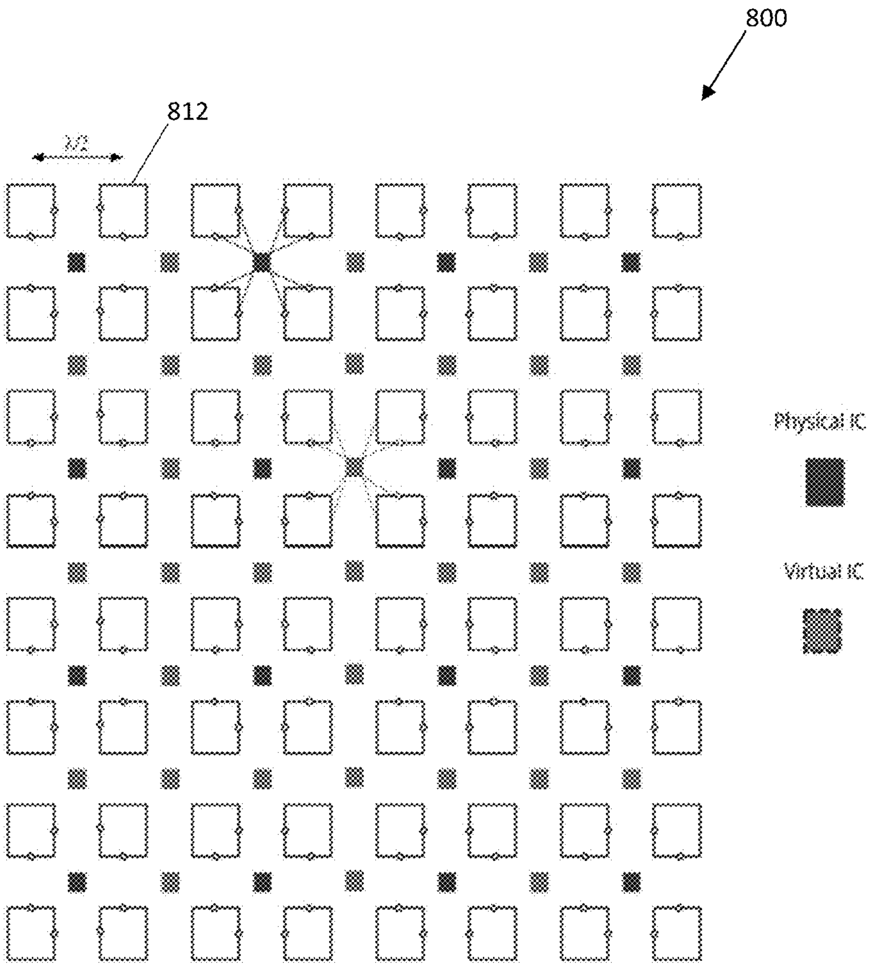
FIG. 8A is a schematic diagram of an 8×8 antenna array in an example embodiment.

FIG. 8A is a schematic diagram of an 8×8 antenna array (800) in an example embodiment. The antenna array (800) comprises 64 antenna elements (e.g., 812) arranged in an 8×8 square lattice configuration. Each antenna element (812) comprises two feeding ports. In total, the 8×8 antenna array comprises 128 ports made up of 64 vertical ports and 64 horizontal ports. In this example, the antenna elements (e.g., 812) are designed at Ka-band of 27.5-30 GHZ, and the spacing between adjacent antenna elements (i.e., element spacing) is 5 mm (half wavelength at 30 GHZ) (i.e., $\lambda/2=5$ mm). A total number of 16 physical ICs and 33 virtual ICs are used.

Figure 8B:
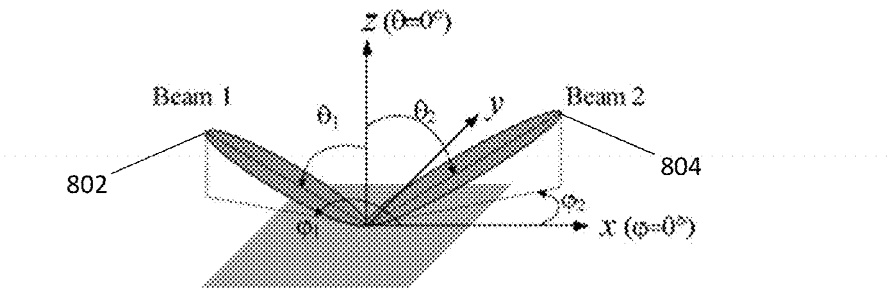
FIG. 8B is a schematic diagram of a first combined CP beam and a second combined CP beam produced by the antenna array in the example embodiment.

FIG. 8B is a schematic diagram of a first combined CP beam (802) and a second combined CP beam (804) produced by the antenna array (800) in the example embodiment. $\theta$ represents an angle measured from the Z-axis to the CP beam. $\varphi$ represents an angle measured from the X-axis to the projection of the beam in the X-Y plane.

Figure 9A:
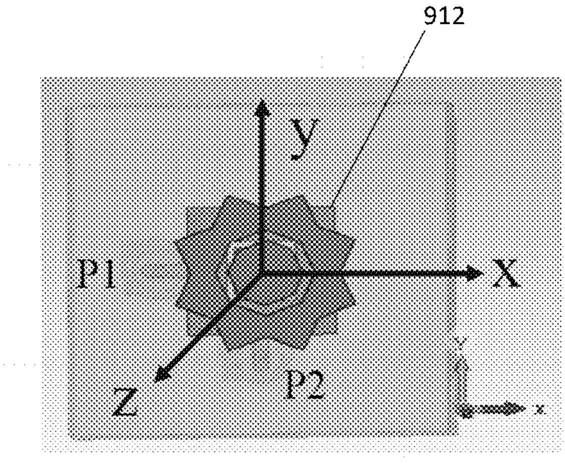
FIG. 9A is a schematic top view drawing of a two-port antenna element in an example embodiment.
Figure 9B:
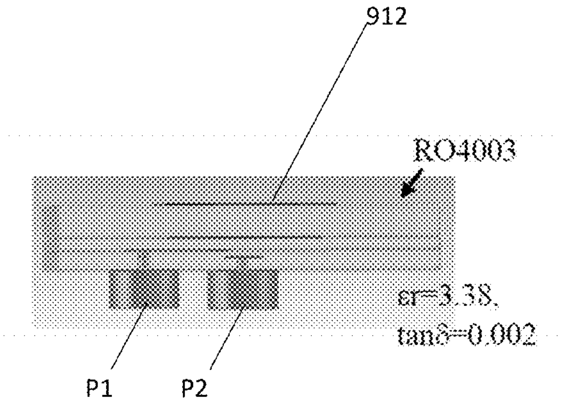
FIG. 9B is a schematic cross-sectional view drawing of the two-port antenna element in the example embodiment.

FIG. 9A is a schematic top view drawing of a two-port antenna element (912, also compare 812 of FIG. 8) in an example embodiment. FIG. 9B is a schematic cross-sectional view drawing of the two-port antenna element (912) in the example embodiment. The antenna element (912) is fabricated on a layer of RO4003 printed circuit board (PCB) material measuring 5.0 mm in length by 5.0 mm in width by 1.1 mm in thickness. The RO4003 PCB material has a dielectric constant (εr) of 3.38 and a loss tangent (tan δ) of 0.002. Each of the ports is directly connected with one channel from a physical IC.

Figure 9C:
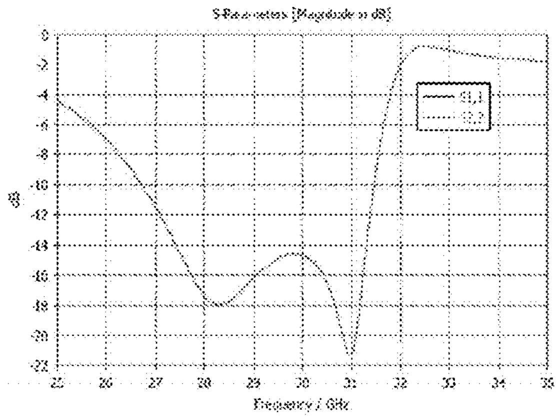
FIG. 9C is a plot of simulated S-parameters $|S_{11}|$ and $|S_{22}|$ of the two-port antenna element in the example embodiment.

FIG. 9C is a plot of simulated S-parameters $|S_{11}|$ and $|S_{22}|$ of the two-port antenna element (912) in the example embodiment. The S-parameters $|S_{11}|$ and $|S_{22}|$ represent the impedance matching at the port #1 and #2. The antenna element has a symmetrical structure and hence it is observed from FIG. 9C that the $|S_{11}|$ and $|S_{22}|$ are the same and overlapping each other. As shown in FIG. 9C, the impedance matching is good with reflection coefficient better than −14 dB from 27.5 GHz to 31 GHz.

Figure 9D:
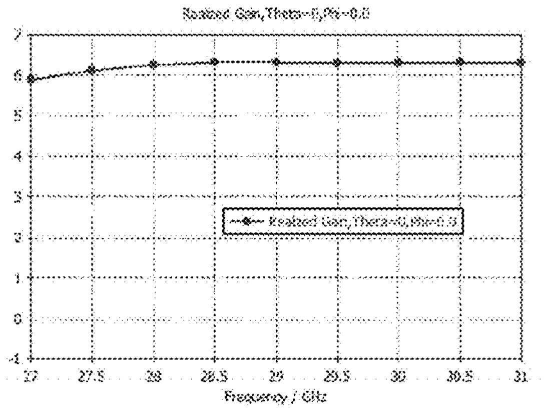
FIG. 9D is a plot of antenna gain of the two-port antenna element in the example embodiment.

FIG. 9D is a plot of antenna gain of the two-port antenna element (912) in the example embodiment. FIG. 9D shows the realized antenna gain with frequency and it is greater than 6 dBi across the frequency range from 27.5 GHz to 31 GHz.

Figure 10A:
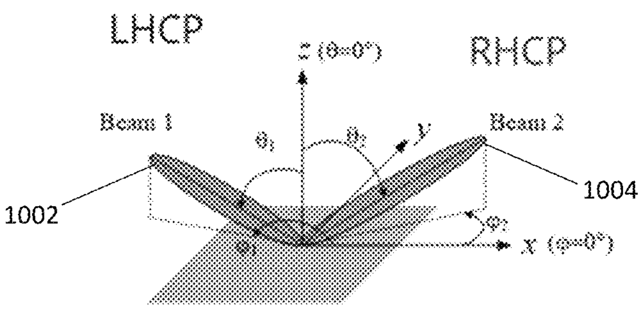
FIG. 10A is a schematic diagram of a first combined CP beam with LHCP and a second combined CP beam with RHCP in an example embodiment.
Figure 10B:
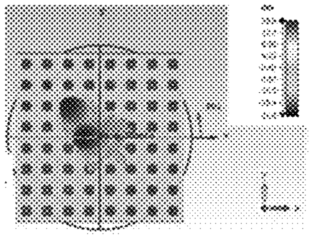
FIG. 10B is a plot of total radiation pattern of the first beam at ($\varphi_1$=135°, $\theta_1$=30°) and the second beam at ($\varphi_2$=180°, $\theta_2$=10°) in the example embodiment.
Figure 10C:
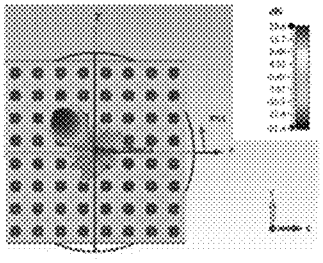
FIG. 10C is a plot of radiation pattern of the first beam with LHCP only at ($\varphi_1$=135°, $\theta_1$=30°) in the example embodiment.
Figure 10D:
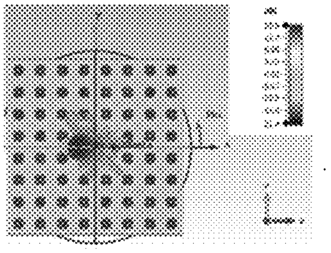
FIG. 10D is a plot of radiation pattern of the second beam with RHCP only at ($\varphi_2$=180°, $\theta_2$=10°) in the example embodiment.
Figure 10E:
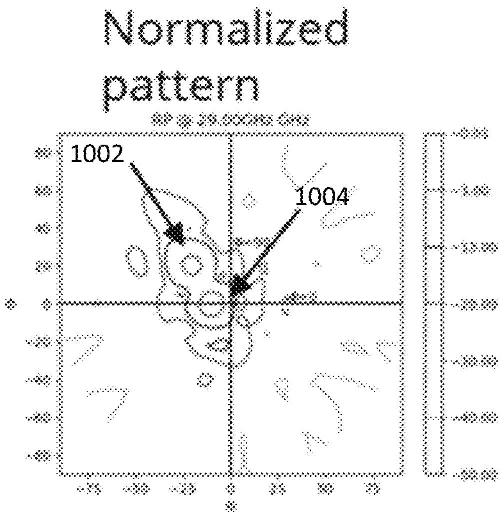
FIG. 10E is a plot showing a normalized pattern of the first beam at ($\varphi_1$=135°, $\theta_1$=30°) and the second beam at ($\varphi_2$=180°, $\theta_2$=10°) in the example embodiment.
Figure 10F:
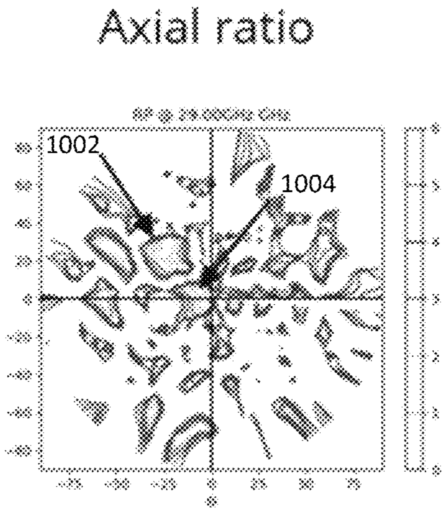
FIG. 10F is a plot showing an axial ratio of the first beam at ($\varphi_1$=135°, $\theta_1$=30°) and the second beam at ($\varphi_2$=180°, $\theta_2$=10°) in the example embodiment.

FIG. 10A is a schematic diagram of a first combined CP beam (1002) (compare first combined CP beam (206) of FIG. 2B) with LHCP and a second combined CP beam (1004) (compare second combined CP beam (208) of FIG. 2B) with RHCP in an example embodiment. FIG. 10B to FIG. 10P are a series of plots showing radiation patterns of the first CP beam (1002) and the second CP beam (1004) in the example embodiment. The first CP beam (1002) and second CP beam (1004) are two opposite CP beams (one LHCP beam and one RHCP beam, respectively) pointing at different directions. θ represents an angle measured from the Z-axis to the CP beam. φ represents an angle measured from the X-axis to the projection of the beam in the X-Y plane. The total pattern and split LHCP/RHCP patterns are provided in the following figures.

FIG. 10B is a plot of total radiation pattern of the first beam (1002) at ($\varphi_1$=135°, $\theta_1$=30°) and the second beam (1004) at (φ2=180°, $\theta_2$=10°) in the example embodiment. FIG. 10C is a plot of radiation pattern of the first beam (1002) with LHCP only at ($\varphi_1$=135°, $\theta_1$=30°) in the example embodiment. FIG. 10D is a plot of radiation pattern of the second beam (1004) with RHCP only at ($\varphi_2$=180°, $\theta_2$=10°) in the example embodiment. FIG. 10E is a plot showing a normalized pattern of the first beam (1002) at ($\varphi_1$=135°, $\theta_1$=30°) and the second beam (1004) at (Q2=180°, O2=) 10° in the example embodiment. FIG. 10F is a plot showing an axial ratio of the first beam (1002) at ($\varphi_1$=135°, $\theta_1$=30°) and the second beam (1004) at (φ2=180°, $\theta_2$=10°) in the example embodiment.

Figure 10G:
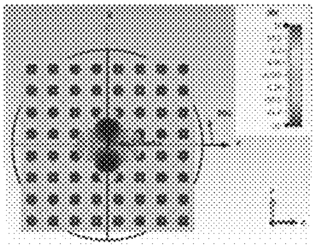
FIG. 10G is a plot of total radiation pattern of the first beam at ($\varphi_1$=90°, $\theta_1$=10°) and the second beam at ($\varphi_2$=270°, $\theta_2$=10°) in the example embodiment.
Figure 10H:
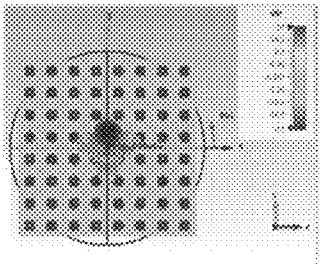
FIG. 10H is a plot of radiation pattern of the first beam at ($\varphi_1$=90°, $\theta_1$=10°) with LHCP only in the example embodiment.
Figure 10I:
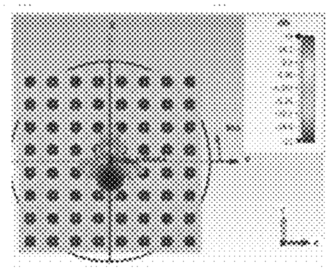
FIG. 10I is a plot of radiation pattern of the second beam at ($\varphi_2$=270°, $\theta_2$=10°) with RHCP only in the example embodiment.
Figure 10J:
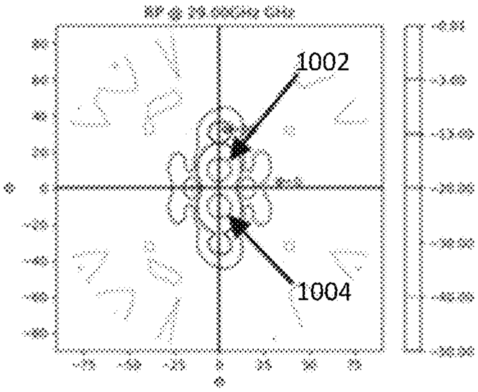
FIG. 10J is a plot showing a normalized pattern of the first beam at ($\varphi_1$=90°, $\theta_1$=10°) and the second beam at ($\varphi_2$=270°, $\theta_2$=10°) in the example embodiment.
Figure 10K:
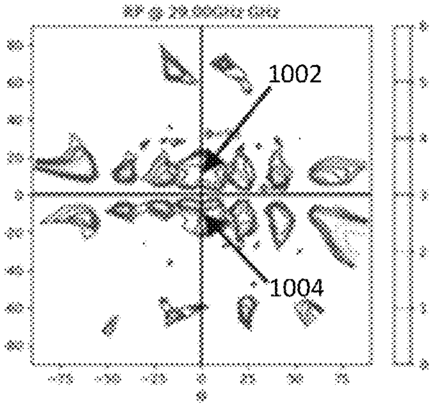
FIG. 10K is a plot showing an axial ratio of the first beam at ($\varphi_1$=90°, $\theta_1$=10°) and the second beam at ($\varphi_2$=270°, $\theta_2$=10°) in the example embodiment.

FIG. 10G is a plot of total radiation pattern of the first beam (1002) at ($\varphi_1$=90°, $\theta_1$=10°) and the second beam (1004) at ($\varphi_2$=270°, $\theta_2$=10°) in the example embodiment. FIG. 10H is a plot of radiation pattern of the first beam (1002) at ($\varphi_1$=90°, $\theta_1$=10°) with LHCP only in the example embodiment. FIG. 10I is a plot of radiation pattern of the second beam (1004) at ($\varphi_2$=270°, $\theta_2$=10°) with RHCP only in the example embodiment. FIG. 10J is a plot showing a normalized pattern of the first beam (1002) at ($\varphi_1$=90°, $\theta_1$=10°) and the second beam (1004) at ($\varphi_2$=270°, $\theta_2$=10°) in the example embodiment. FIG. 10K is a plot showing an axial ratio of the first beam (1002) at ($\varphi_1$=90°, $\theta_1$=10°) and the second beam (1004) at ($\varphi_2$=270°, $\theta_2$=10°) in the example embodiment.

Figure 10L:
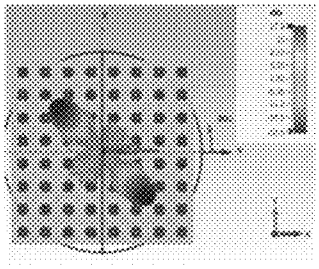
FIG. 10L is a plot of total radiation pattern of the first beam at ($\varphi_1$=135°, $\theta_1$=40) and the second beam at ($\varphi_2$=315°, $\theta_2$=40°) in the example embodiment.
Figure 10M:
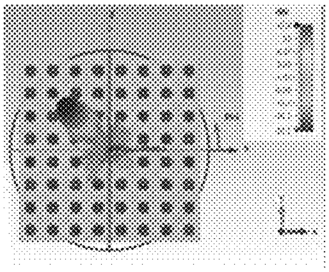
FIG. 10M is a plot of radiation pattern of the first beam at ($\varphi_1$=135°, $\theta_1$=40°) with LHCP only in the example embodiment.
Figure 10N:
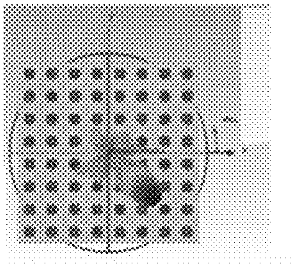
FIG. 10N is a plot of radiation pattern of the second beam at ($\varphi_2$=315°, $\theta_2$=40°) with RHCP only in the example embodiment.
Figure 10O:
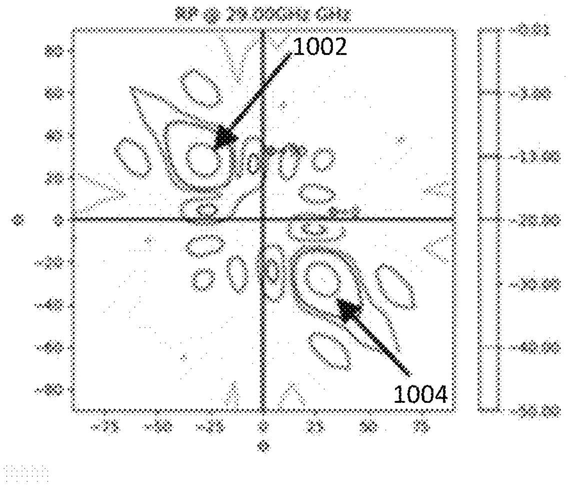
FIG. 10O is a plot showing a normalized pattern of the first beam at ($\varphi_1$=135°, $\theta_1$=40°) and the second beam at ($\varphi_2$=315°, $\theta_2$=40°) in the example embodiment.
Figure 10P:
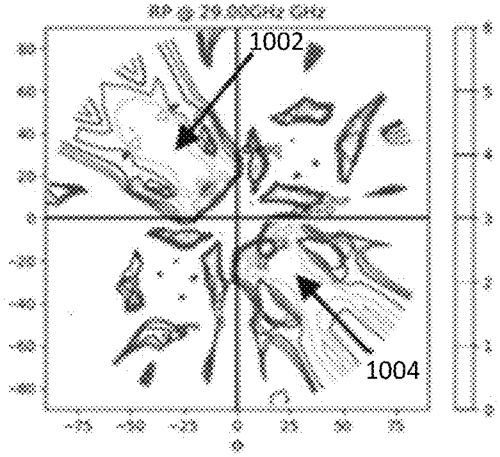
FIG. 10P is a plot showing an axial ratio of the first beam at ($\varphi_1$=135°, $\theta_1$=40) and the second beam at ($\varphi_2$=315°, $\theta_2$=40°) in the example embodiment.

FIG. 10L is a plot of total radiation pattern of the first beam (1002) at ($\varphi_1$=135°, $\theta_1$=40) and the second beam (1004) at ($\varphi_2$=315°, $\theta_2$=40°) in the example embodiment. FIG. 10M is a plot of radiation pattern of the first beam (1002) at ($\varphi_1$=135°, $\theta_1$=40) with LHCP only in the example embodiment. FIG. 10N is a plot of radiation pattern of the second beam (1004) at (φ2=315°, $\theta_2$=40°) with RHCP only in the example embodiment. FIG. 10O is a plot showing a normalized pattern of the first beam (1002) at ($\varphi_1$=135°, $\theta_1$=40) and the second beam (1004) at ($\varphi_2$=315°, $\theta_2$=40°) in the example embodiment. FIG. 10P is a plot showing an axial ratio of the first beam (1002) at ($\varphi_1$=135°, $\theta_1$=40) and the second beam (1004) at ($\varphi_2$=315°, $\theta_2$=40°) in the example embodiment.

In the example embodiment, for a small antenna array, if the LHCP and RHCP beams are too close to each other, it will be difficult to differentiate the beams because of the large antenna beamwidth. For a larger antenna array with narrower beamwidth, there is no issue separating the beams.

Figure 11A:
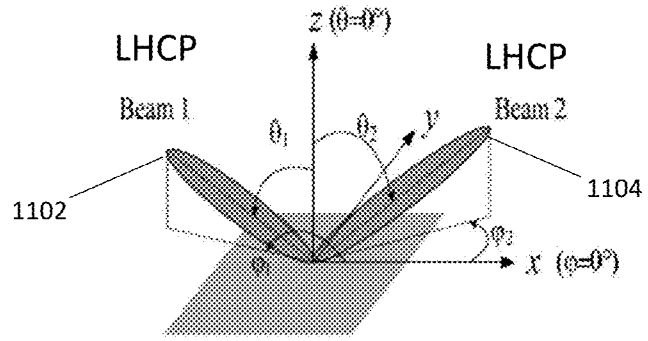
FIG. 11A is a schematic diagram of a first combined CP beam with LHCP and a second combined CP beam with LHCP in another example embodiment.

The examples in FIG. 10 show that two beams with opposite CP can be generated. Next, the same array can also generate two beams with the same CP. FIG. 11A is a schematic diagram of a first combined CP beam (1102) (compare first combined CP beam (206) of FIG. 2B) with LHCP and a second combined CP beam (1104) (compare second combined CP beam (208) of FIG. 2B) with LHCP in another example embodiment. FIG. 11B to FIG. 11F are a series of plots showing radiation patterns of the first CP beam (1102) and the second CP beam (1104) in the example embodiment. The first CP beam (1102) and second CP beam (1104) are two symmetrical beams with the same CP being generated and steered. θ represents an angle measured from the Z-axis to the CP beam. φ represents an angle measured from the X-axis to the projection of the beam in the X-Y plane.

Figures 11B, 11C, 11D:
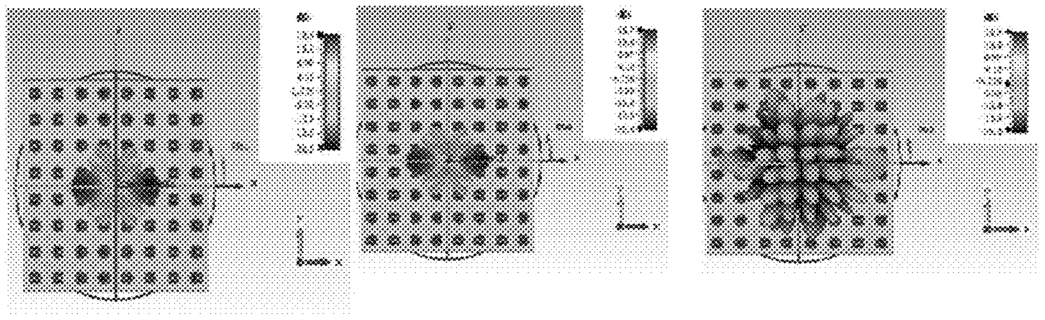
FIG. 11B is a plot of total radiation pattern of the first beam at ($\varphi_1$=180°, $\theta_1$=20°) and the second beam at ($\varphi_2$=0°, $\theta_2$=20°) in the example embodiment.
FIG. 11C is a plot of a co-polarization (LHCP) radiation pattern of the first beam at ($\varphi_1$=180°, $\theta_1$=20°) and the second beam at ($\varphi_2$=0°, $\theta_2$=20°) in the example embodiment.
FIG. 11D is a plot of a cross polarization (RHCP) radiation pattern of the first beam and the second beam in the example embodiment.
Figures 11E, 11F:
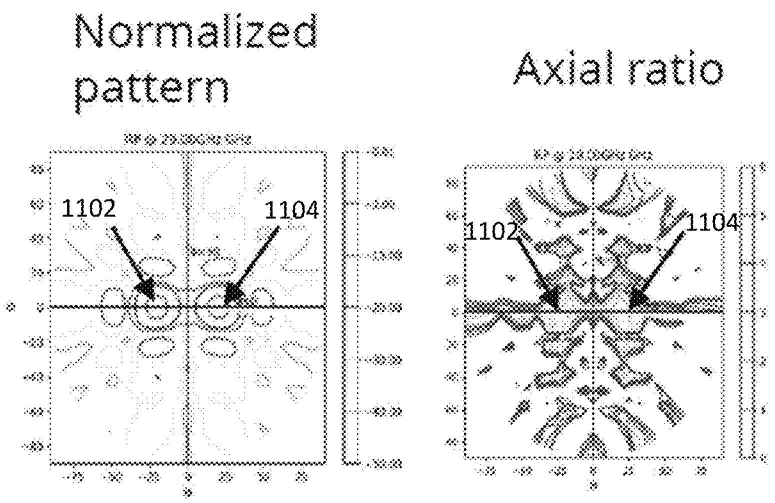
FIG. 11E is a plot showing a normalized pattern of the first beam at ($\varphi_1$=180°, $\theta_1$=20°) and the second beam at ($\varphi_2$=0°, $\theta_2$=20°) in the example embodiment.
FIG. 11F is a plot showing an axial ratio of the first beam at ($\varphi_1$=180°, $\theta_1$=20°) and the second beam at ($\varphi_2$=0°, $\theta_2$=20°) in the example embodiment.

FIG. 11B is a plot of total radiation pattern of the first combined beam (1102) at ($\varphi_1$=λ°, $\theta_1$=20°) and the second combined beam (1104) at ($\varphi_2$=0° and $\theta_2$=20°) in the example embodiment. FIG. 11C is a plot of a co-polarization (LHCP) radiation pattern of the first beam at ($\varphi_1$=180°, $\theta_1$=20°) and the second beam at ($\varphi_2$=0° and $\theta_2$=20°) in the example embodiment. FIG. 11D is a plot of a cross polarization (RHCP) radiation pattern of the first beam (1102) and the second beam (1104) in the example embodiment. It is found that the energy is mainly distributed to LHCP as expected. FIG. 11E is a plot showing a normalized pattern of the first beam (1102) at ($\varphi_1$=180°, $\theta_1$=20°) and the second beam (1104) at (φ2=0° and 02=20°) in the example embodiment. FIG. 11F is a plot showing an axial ratio of the first beam (1102) at (φ1=180°, $\theta_1$=20°) and the second beam (1104) at ($\varphi_2$=0° and $\theta_2$=20°) in the example embodiment.

Figure 12A:
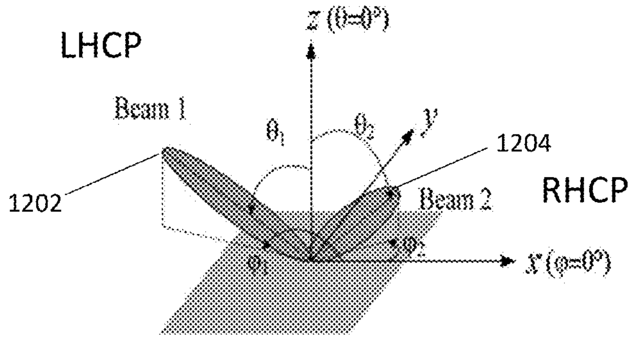
FIG. 12A is a schematic diagram of a first combined CP beam with LHCP and higher radiated/received power and a second combined CP beam with RHCP and lower radiated/received power in another example embodiment.

FIG. 12A is a schematic diagram of a first combined CP beam (1202) (compare first combined CP beam (206) of FIG. 2B) with LHCP and higher radiated/received power and a second combined CP beam (1204) (compare second combined CP beam (208) of FIG. 2B) with RHCP and lower radiated/received power in another example embodiment. FIG. 12B to FIG. 12F are a series of plots showing radiation patterns of the first CP beam (1202) and the second CP beam (1204) in the example embodiment. The first CP beam (1202) and second CP beam (1204) are two symmetrical beams with the same CP being generated and steered, where the total power is divided into two different power levels. One CP beam (i.e., the second CP beam (1204)) has only 1% power (−20 dB less) compared to the other CP beam (i.e., the first CP beam (1202)). θ represents an angle measured from the Z-axis to the CP beam. ϕ represents an angle measured from the X-axis to the projection of the beam in the X-Y plane.

Figure 12B:
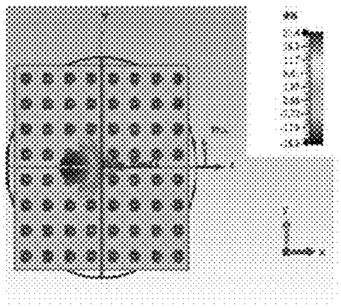
FIG. 12B is a plot of total radiation pattern of the first beam with higher antenna gain at ($\varphi_1$=180°, $\theta_1$=20°) and the second beam with lower antenna gain at ($\varphi_2$=0°, $\theta_2$=20°) in the example embodiment.
Figure 12C:
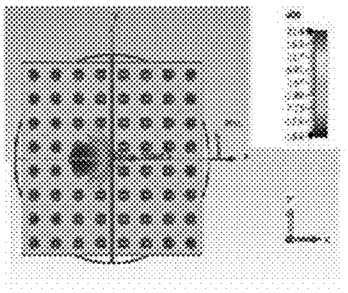
FIG. 12C is a plot of radiation pattern of the first beam at ($\varphi_1$=180°, $\theta_1$=20°) with higher antenna gain and LHCP only in the example embodiment.
Figure 12D:
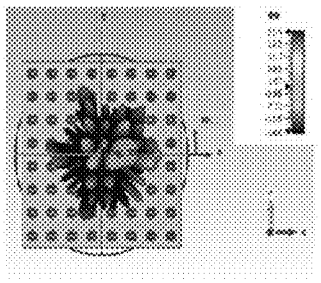
FIG. 12D is a plot of radiation pattern of the second beam at ($\varphi_2$=0°, $\theta_2$=20°) with lower antenna gain and RHCP only in the example embodiment.
Figure 12E:
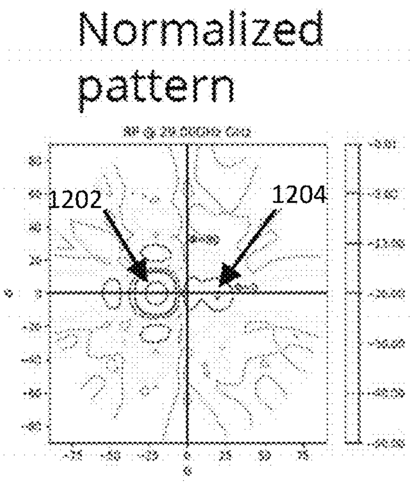
FIG. 12E is a plot showing a normalized pattern of the first beam at ($\varphi_1$=180°, $\theta_1$=20°) and the second beam at ($\varphi_2$=0°, $\theta_2$=20°) in the example embodiment.
Figure 12F:
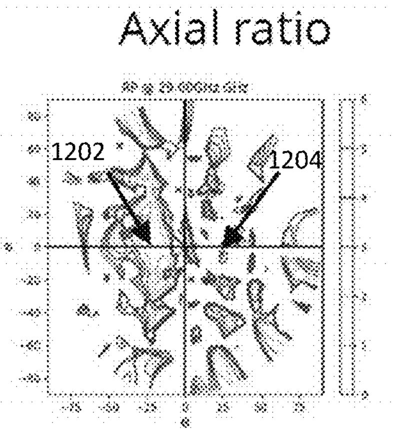
FIG. 12F is a plot showing an axial ratio of the first beam at ($\varphi_1$=180°, $\theta_1$=20°) and the second beam at ($\varphi_2$=0°, $\theta_2$=20°) in the example embodiment.

FIG. 12B is a plot of total radiation pattern of the first beam (1202) with higher antenna gain at ($\varphi_1$=180°, $\theta_1$=20°) and the second beam (1204) with lower antenna gain at ($\varphi_2$=0° and $\theta_2$=20°) in the example embodiment. FIG. 12C is a plot of radiation pattern of the first beam at ($\varphi_1$=180°, $\theta_1$=20°) with higher antenna gain and LHCP only in the example embodiment. FIG. 12D is a plot of radiation pattern of the second beam (1204) at ($\varphi_2$=0° and $\theta_2$=20°) with lower antenna gain and RHCP only in the example embodiment. FIG. 12E is a plot showing a normalized pattern of the first beam (1202) at ($\varphi_1$=180°, $\theta_1$=20°) and the second beam (1204) at ($\varphi_2$=0° and $\theta_2$=20°) in the example embodiment. FIG. 12F is a plot showing an axial ratio of the first beam (1202) at ($\varphi_1$=180°, $\theta_1$=20°) and the second beam (1204) at ($\varphi_2$=0° and $\theta_2$=) 20° in the example embodiment.

It will be appreciated that the aperture for the small power CP remains the same so that beam shape and the beamwidth are not changed, the antenna directivity is kept unchanged while the antenna gain is reduced.

The overall EIRP for a transmitting array is compared with the conventional approach with separated apertures as shown in FIG. 13 and Table 1 and Table 2. It will be appreciated that for a receiving array, a similar conclusion can be made for the antenna gain to noise temperature (G/T), where G is the antenna gain in decibels at the receive frequency and T is the equivalent noise temperature of the receiving system in kelvins.

Figure 13A:
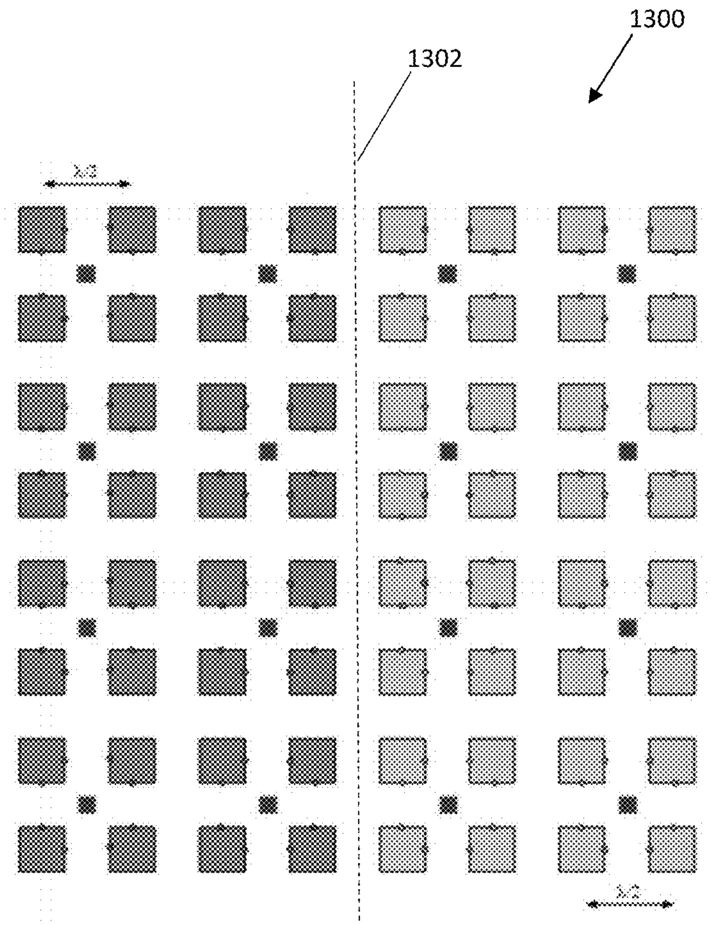
FIG. 13A is a schematic diagram of an 8×8 antenna array in an example embodiment.
Figure 13B:
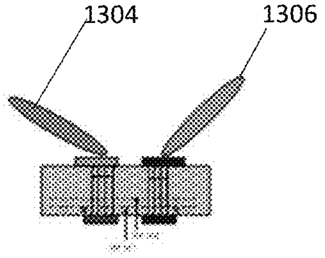
FIG. 13B is a schematic diagram of two combined CP beams generated by the 8×8 antenna array in the example embodiment.

FIG. 13A is a schematic diagram of an 8×8 antenna array (1300) in an example embodiment. FIG. 13B is a schematic diagram of two combined CP beams (1304, 1306) generated by the 8×8 antenna array (1300) in the example embodiment. The antenna array (1300) of FIG. 13A is used as a comparative example to show the conventional approach using the same panel to generate two beams by separating the aperture into two halves as shown by the dotted line (1302). In this case, each half of the elements generate one of the two separate combined CP beams (1304, 1306). These two CP beams (1304, 1306) can be of the opposite or the same polarization. The two beams (1304, 1306) can be independently steered as well.

Assuming that each port is excited by a RF transmitter with an output power of 8 dBm. The obtained EIRP for various scanning directions are compared in Table 1 and Table 2.

TABLE 1

EIRP for dual-beam scanning of one 8 × 8 module using conventional method

| Scanning angles (φ, θ) | | Accept power of | EIRP (dBm) | |
|---|---|---|---|---|
| Beam 1 | Beam 2 | 128 ports (dBm) | Beam 1 | Beam 2 |
| [0, 10] | [180, 10] | 29 | 45.14 | 45.17 |
| [0, 20] | [180, 20] | 29 | 44.9 | 45.05 |
| [0, 30] | [180, 30] | 29 | 44.5 | 44.73 |
| [0, 40] | [180, 40] | 29 | 43.97 | 44.24 |
| [0, 50] | [180, 50] | 29 | 42.88 | 43.05 |

TABLE 2

EIRP for dual-beam scanning of one 8 × 8 module based on the approach as disclosed herein

| Scanning angles (φ, θ) | | Accept power of | EIRP (dBm) | |
|---|---|---|---|---|
| Beam 1 | Beam 2 | 128 ports (dBm) | Beam 1 | Beam 2 |
| [0, 10] | [180, 10] | 28.08 | 46.81 | 46.92 |
| [0, 20] | [180, 20] | 28.08 | 46.76 | 46.72 |
| [0, 30] | [180, 30] | 28.59 | 46.83 | 46.84 |
| [0, 40] | [180, 40] | 27.97 | 45.52 | 45.62 |
| [0, 50] | [180, 50] | 27.74 | 44.09 | 44.48 |

The EIRP improvement ranges from 1.2 dB (31%) to 2.3 dB (70%) without any extra resources located to the same module. If the scanning range is [−40°, 40°], the EIRP improvements are always more than 1.6 dB (44%).

The power and resource can also be allocated to the two beams to communicate with satellites in different orbits with an optimized manner. In the case of FIG. 12A to FIG. 12F where only 1% power allocated to one of the beams. The main beam shape remains the same and because there is a larger ratio of power is located to the other beam, its antenna gain boosted further. The total accepted power in this example is 27.92 dBm, the EIRP of the LHCP beam and RHCP is 49.28 dBm and 27.65 dBm, respectively.

Figure 14:
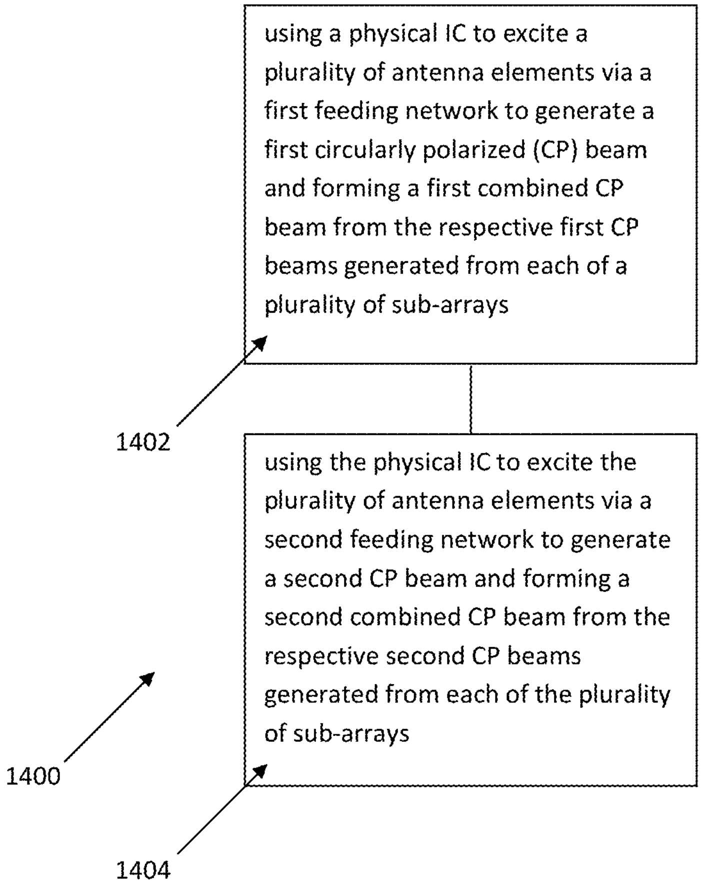
FIG. 14 is a schematic flowchart for illustrating a method of generating CP beams using an array antenna in an example embodiment.

FIG. 14 is a schematic flowchart (1400) for illustrating a method of generating CP beams using an array antenna in an example embodiment. The array antenna comprises a plurality of sub-arrays, each of the plurality of sub-arrays comprising, a plurality of antenna elements, each antenna element comprising a first feeding port and a second feeding port; a physical IC comprising a plurality of first and second output channels; a first feeding network comprising a plurality of first feed lines communicatively coupling each of the first output channels of the physical IC to a first feeding port of each of the plurality of antenna elements; and a second feeding network comprising a plurality of second feed lines communicatively coupling each of the second output channels of the physical IC to a second feeding port of each of the plurality of antenna elements. At step (1402), the physical IC is used to excite the plurality of antenna elements via the first feeding network to generate a first CP beam and a first combined CP beam is formed from the respective first CP beams generated from each of the plurality of sub-arrays. At step (1404), the physical IC is used to excite the plurality of antenna elements via the second feeding network to generate a second CP beam and a second combined CP beam is formed from the respective second CP beams generated from each of the plurality of sub-arrays. It will be appreciated that steps (1402) and (1404) may be performed simultaneously/concurrently.

In the example embodiment, the plurality of antenna elements in all the plurality of sub-arrays may be collectively arranged in a square lattice configuration having a first direction and a second direction, wherein the second direction is substantially perpendicular to the first direction. Any two immediately adjacent antenna elements positioned along the first direction and any two immediately adjacent antenna elements positioned along the second direction may be separated by a distance of about 0.5λ, where λ represents a free space wavelength of the first or second CP beam.

In the example embodiment, the array antenna may further comprise a virtual sub-array comprising antenna elements of neighboring sub-arrays and the method may further comprise configuring the physical ICs of the neighboring sub-arrays to respectively excite the antenna elements of the virtual sub-array to generate a third and/or a fourth CP beam to remove the grating lobes, said third CP beam contributing to form the first combined CP beam, and said fourth CP beam contributing to form the second combined CP beam. In the example embodiment, the step of configuring the physical ICs of the neighboring sub-arrays to respectively excite the antenna elements of the virtual sub-array may comprise adjusting an amplitude and a phase of excitation of respective antenna elements coupled thereto, in order to generate the third and/or fourth CP beams. In the example embodiment, the virtual sub-array may be formed from antenna elements from two sub-arrays that are adjacent to each other along the first direction or the second direction, said antenna elements of the virtual sub-array immediately adjacent to each other within the square lattice. In the example embodiment, the virtual sub-array may be formed from antenna elements from four sub-arrays that are arranged in a 2×2 configuration, said antenna elements of the virtual sub-array immediately adjacent to each other within the square lattice.

In the example embodiment, the method may further comprise exciting the plurality of antenna elements in each sub-array and virtual sub-array using the physical IC in each sub-array in a sequentially rotated manner with identical amplitude and 90° phase difference. In the example embodiment, the method may further comprise simultaneously generating the first, and second CP beams, wherein the first and second CP beams are each independently a left-handed circularly polarized (LHCP) beam or a right-handed circularly polarized (RHCP) beam. In the example embodiment, the method may further comprise simultaneously generating the first, second, third and fourth CP beams, wherein the third CP beam follows the direction of polarization of the first CP beam and the fourth CP beam follows the direction of polarization of the second CP beam.

In the example embodiment, the method may further comprise performing amplitude quantization of the CP beams using the physical IC in each sub-array, wherein the amplitude quantization is implemented by selecting a cut-off value of amplitude to achieve a distribution of amplitudes with less tapering and normalizing the distribution of amplitudes to a new reference value based on the cut-off value.

In the described example embodiments, an electronically steered circularly polarized array antenna with independently controlled beams, e.g., two independently controlled circularly polarized beams, is disclosed. The array antenna may comprise an array of four antenna elements (2×2) coupled to a physical IC, each antenna element comprising two feeding ports for electrically coupling the antenna element to the physical IC; wherein each array of antenna elements is configured for simultaneous generation of two CP beams; and wherein the two CP beams comprise a LHCP beam or a RHCP beam.

Advantageously, the array antenna may provide sub-arrays with dual-beam sequentially rotated CP antenna elements that are capable of generating two independent CP beams simultaneously. Even more advantageously, the two independent CP beams that are simultaneously generated may be independently controlled steering CP beams with full utilization of an antenna aperture, which enables simultaneous communications to multiple satellites with enhanced system efficiency.

In the described example embodiments, the array antenna may further comprise more than one array of antenna elements arranged in a network; wherein any two adjacent arrays of antenna elements are coupled to each other by a virtual IC; and wherein excitation of the virtual IC is implemented by re-weighting the output phase and amplitude of the physical ICs. Advantageously, the virtual sub-arrays with virtual dual-beam sequentially rotated CP antenna elements with virtual chip may advantageously be capable of suppressing grating lobes to enable large scanning range.

In the described example embodiments, the physical IC may be configured to perform quantization, e.g., amplitude quantization, of the CP beams, wherein the amplitude quantization is implemented by selecting a cut-off value of amplitude to achieve a distribution of amplitudes with less tapering and normalizing the distribution of amplitudes to a new reference value based on the cut-off value. Advantageously, amplitude quantization of the excitation may provide enhancement in terms of antenna aperture efficiency.

In the described example embodiments, due to the shared antenna aperture, the effective antenna aperture for each of the beam is maximized and the overall gain has been improved for the same hardware and power resources. In addition, the amplitude tapering in array elements is also applicable to the various embodiments of the antenna array to meet regulated transmission mask requirement. It will be appreciated that the tapering is applied to the circularly polarized sequentially rotated dual-beam antenna element, or the 2×2 sub-array. The described example embodiments of the planar array antenna may further provide independently controlled beam scanning and polarization for two CP beams with high aperture efficiency, symmetrical beam shape for two beams, large scanning range (+/−) 50° with low sidelobes and low scan loss (3 dB), and an unbalanced power allocation without changing the radiation efficiency for multi-orbit satellite communication.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g. medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in Bluetooth technology. The computer program when loaded and executed on a suitable reader effectively results in an apparatus that can implement the steps of the described methods.

The example embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For an example, when "comprising" is used, reference to a "one" feature is also intended to be a reference to "at least one" of that feature. Terms such as "consisting", "consist", and the like, may, in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

In example embodiments, the array antenna is described as comprising 4, 16 or 64 antenna elements. However, it will be appreciated that the array antenna is not limited as such and may be configured to comprise other numbers of antenna elements. Similarly, the array antenna may be configured to comprise other numbers of physical and virtual sub-arrays.

In example embodiments, the physical sub-array is described as comprising 4 antenna elements coupled to a physical IC. However, it will be appreciated that the physical sub-array is not limited as such and may comprise more or less than 4 antenna elements coupled to each physical IC.

In example embodiments, the physical IC is described as an 8-channel IC. However, it will be appreciated that the physical IC is not limited as such and may comprise other numbers of channels, depending on the number of antenna elements to be coupled thereto and the number of ports on each antenna element.

In example embodiments, the physical ICs are described to excite the plurality of antenna elements of each sub-array and virtual sub-array in a sequentially rotated manner with identical amplitude and 90° phase difference. However, it will be appreciated that the excitation of the plurality of antenna elements are not limited as such and may be varied with different amplitudes and other degrees of phase difference.

In example embodiments, the antenna element is described as having two orthogonal feeding ports. However, it will be appreciated that the antenna element is not limited as such and may comprise other numbers of feeding ports, and the feeding ports may be orientated at other angles with respect to each other or one another. The antenna element in FIG. 9 is an example, any antenna that have more than two ports and with good port isolation can be used. It will be appreciated that while the example embodiments show antenna elements with two ports, antenna elements having more than two ports (with the appropriate port isolation) may be used without deviating from the scope of the invention.

It will be appreciated by a person skilled in the art that other variations and/or modifications may be made to the specific embodiments without departing from the scope of the invention as broadly described. For example, in the description herein, features of different exemplary embodiments may be mixed, combined, interchanged, incorporated, adopted, modified, included etc. or the like across different exemplary embodiments. The present embodiments are, therefore, to be considered in all respects to be illustrative and not restrictive.

The invention claimed is:

1. An array antenna comprising, a plurality of sub-arrays, each of the plurality of sub-arrays comprising, a plurality of antenna elements, each antenna element comprising a first feeding port and a second feeding port;

a physical integrated circuit (IC) comprising a plurality of first and second output channels;

a first feeding network comprising a plurality of first feed lines communicatively coupling each of the first output channels of the physical IC to a first feeding port of each of the plurality of antenna elements;

a second feeding network comprising a plurality of second feed lines communicatively coupling each of the second output channels of the physical IC to a second feeding port of each of the plurality of antenna elements; and a virtual sub-array comprising antenna elements of neighboring sub-arrays;

wherein the physical IC is configured to excite the plurality of antenna elements via the first feeding network to generate a first circularly polarized (CP) beam and to excite the plurality of antenna elements via the second feeding network to generate a second CP beam, wherein the respective first CP beams from each of the plurality of sub-arrays form a first combined CP beam; and the respective second CP beams from each of the plurality of sub-arrays form a second combined CP beam, and wherein the physical ICs of the neighboring sub-arrays are configured to respectively excite the antenna elements of the virtual sub-array to generate a third and/or a fourth CP beam, said third CP beam contributing to form the first combined CP beam, and said fourth CP beam contributing to form the second combined CP beam.

2. The array antenna according to claim 1, wherein the plurality of antenna elements in all the plurality of sub-arrays are collectively arranged in a square lattice configuration having a first direction and a second direction, wherein the second direction is substantially perpendicular to the first direction, and wherein any two immediately adjacent antenna elements positioned along the first direction and any two immediately adjacent antenna elements positioned along the second direction are separated by a distance of about 0.5λ, where λ represents a free space wavelength of the first or second CP beam.

3. The array antenna according to claim 1, wherein the physical ICs of the neighboring sub-arrays are respectively configured to adjust an amplitude and a phase of excitation of respective antenna elements coupled thereto, in order to generate the third and/or fourth CP beams.

4. The array antenna according to claim 2, wherein the virtual sub-array is formed from antenna elements from two sub-arrays that are adjacent to each other along the first direction or the second direction, said antenna elements of the virtual sub-array immediately adjacent to each other within the square lattice; or wherein the virtual sub-array is formed from antenna elements from four sub-arrays that are arranged in a 2×2 configuration, said antenna elements of the virtual sub-array immediately adjacent to each other within the square lattice.

5. The array antenna according to claim 1, wherein each of the virtual sub-arrays comprises four antenna elements arranged in a 2×2 square lattice configuration.

6. The array antenna according to claim 2, wherein each virtual sub-array is separated by a distance of about 0.52 from an immediately adjacent sub-array or virtual sub-array positioned along the first direction or the second direction, where λ represents a free space wavelength of the first or second CP beam.

7. The array antenna according to claim 1, wherein the physical ICs are configured to excite the plurality of antenna elements of each sub-array and virtual sub-array in a sequentially rotated manner with identical amplitude and 90° phase difference.

8. The array antenna according to claim 1, wherein the first, second, third and fourth CP beams are simultaneously generated, and wherein the first and second CP beams are each independently a left-handed circularly polarized (LHCP) beam or a right-handed circularly polarized (RHCP) beam, and further wherein the third CP beam follows the direction of polarization of the first CP beam and the fourth CP beam follows the direction of polarization of the second CP beam.

9. The array antenna according to claim 1, wherein the first and second feeding ports of each antenna element are orthogonally orientated with respect to each other.

10. The array antenna according to claim 2, wherein for each sub-array, any two antenna elements that are immediately adjacent to each other along the first direction and second direction are orientated such that one antenna element is rotated at an angle of 90° with respect to the other antenna element.

11. The array antenna according to claim 1, wherein the physical IC is configured to perform amplitude quantization of the CP beams, wherein the amplitude quantization is implemented by selecting a cut-off value of amplitude to achieve a distribution of amplitudes with less tapering and normalizing the distribution of amplitudes to a new reference value based on the cut-off value.

12. A method of generating CP beams using an array antenna comprising, a plurality of sub-arrays, each of the plurality of sub-arrays comprising, a plurality of antenna elements, each antenna element comprising a first feeding port and a second feeding port;

a physical IC comprising a plurality of first and second output channels;

a first feeding network comprising a plurality of first feed lines communicatively coupling each of the first output channels of the physical IC to a first feeding port of each of the plurality of antenna elements;

a second feeding network comprising a plurality of second feed lines communicatively coupling each of the second output channels of the physical IC to a second feeding port of each of the plurality of antenna elements; and a virtual sub-array comprising antenna elements of neighboring sub-arrays;

wherein the method comprises, using the physical IC to excite the plurality of antenna elements via the first feeding network to generate a first circularly polarized (CP) beam and to excite the plurality of antenna elements via the second feeding network to generate a second CP beam, forming a first combined CP beam from the respective first CP beams generated from each of the plurality of sub-arrays and forming a second combined CP beam from the respective second CP beams generated from each of the plurality of sub-arrays, and configuring the physical ICs of the neighboring sub-arrays to respectively excite the antenna elements of the virtual sub-array to generate a third and/or a fourth CP beam, said third CP beam contributing to form the first combined CP beam, and said fourth CP beam contributing to form the second combined CP beam.

13. The method according to claim 12, wherein the plurality of antenna elements in all the plurality of sub-arrays are collectively arranged in a square lattice configuration having a first direction and a second direction, wherein the second direction is substantially perpendicular to the first direction, and wherein any two immediately adjacent antenna elements positioned along the first direction and any two immediately adjacent antenna elements positioned along the second direction are separated by a distance of about 0.5λ, where λ represents a free space wavelength of the first or second CP beam.

14. The method according to claim 12, wherein configuring the physical ICs of the neighboring sub-arrays to respectively excite the antenna elements of the virtual sub-array comprises adjusting an amplitude and a phase of excitation of respective antenna elements coupled thereto, in order to generate the third and/or fourth CP beams.

15. The method according to claim 13, wherein the virtual sub-array is formed from antenna elements from two sub-arrays that are adjacent to each other along the first direction or the second direction, said antenna elements of the virtual sub-array immediately adjacent to each other within the square lattice; or wherein the virtual sub-array is formed from antenna elements from four sub-arrays that are arranged in a 2×2 configuration, said antenna elements of the virtual sub-array immediately adjacent to each other within the square lattice.

16. The method according to claim 12, further comprising exciting the plurality of antenna elements in each sub-array and virtual sub-array using the physical IC in each sub-array in a sequentially rotated manner with identical amplitude and 90° phase difference.

17. The method according to claim 12, further comprising simultaneously generating the first, second, third and fourth CP beams, wherein the first and second CP beams are each independently a left-handed circularly polarized (LHCP) beam or a right-handed circularly polarized (RHCP) beam, and further wherein the third CP beam follows the direction of polarization of the first CP beam and the fourth CP beam follows the direction of polarization of the second CP beam.

18. The method according to claim 12, further comprising performing amplitude quantization of the CP beams using the physical IC in each sub-array, wherein the amplitude quantization is implemented by selecting a cut-off value of amplitude to achieve a distribution of amplitudes with less tapering and normalizing the distribution of amplitudes to a new reference value based on the cut-off value.

* * * * *